(12) United States Patent
Ciuperca

(10) Patent No.: US 12,534,379 B2
(45) Date of Patent: Jan. 27, 2026

(54) LIME AND HYDRAULIC CEMENT MANUFACTURE BY ELECTROLYSIS USING HYALOCLASTITE OR LAVA, CARBON MINERALIZATION BY HYALOCLASTITE OR LAVA ELECTROLYSIS AND METHOD OF MAKING AND USING SAME

(71) Applicant: Greencraft LLC, Norcross, GA (US)

(72) Inventor: Romeo Ilarian Ciuperca, Atlanta, GA (US)

( * ) Notice: Subject to any disclaimer, the term of this patent is extended or adjusted under 35 U.S.C. 154(b) by 0 days.

(21) Appl. No.: 19/202,190

(22) Filed: May 8, 2025

(65) Prior Publication Data

US 2025/0346494 A1    Nov. 13, 2025

Related U.S. Application Data

(60) Provisional application No. 63/644,637, filed on May 9, 2024.

(51) Int. Cl.

| | |
|---|---|
| *C01F 11/18* | (2006.01) |
| *B01D 53/02* | (2006.01) |
| *B01J 20/18* | (2006.01) |
| *B01J 20/22* | (2006.01) |
| *C01B 39/02* | (2006.01) |
| *C01D 7/07* | (2006.01) |
| *C01F 5/24* | (2006.01) |
| *C01F 11/02* | (2006.01) |
| *C04B 7/345* | (2006.01) |

(52) U.S. Cl.
CPC .............. *C01F 11/18* (2013.01); *B01D 53/02* (2013.01); *B01J 20/18* (2013.01); *B01J 20/226* (2013.01); *C01B 39/02* (2013.01); *C01D 7/07* (2013.01); *C01F 5/24* (2013.01); *C01F 11/02* (2013.01); *C04B 7/3453* (2013.01); *B01D 2253/108* (2013.01); *B01D 2253/204* (2013.01); *B01D 2257/504* (2013.01); *B01D 2258/0283* (2013.01)

(58) Field of Classification Search
CPC .. C01F 11/18; C01F 11/02; C01F 5/24; B01D 53/02; B01J 20/18; B01J 20/226; C01B 39/02; C01D 7/07; C04B 7/3453
USPC ........................................................ 423/712
See application file for complete search history.

(56) References Cited

U.S. PATENT DOCUMENTS

| | | |
|---|---|---|
| 3,728,430 A | 4/1973 | Clitheroe et al. |
| 12,291,488 B2 | 5/2025 | Ciuperca |
| 2021/0070656 A1 | 3/2021 | Finke et al. |

FOREIGN PATENT DOCUMENTS

CN    202210741449 A    9/2022

OTHER PUBLICATIONS

U.S. Appl. No. 18/423,001, filed Jan. 25, 2024.
U.S. Appl. No. 18/416,240, filed Jan. 18, 2024.
U.S. Appl. No. 18/588,915, filed Feb. 27, 2024.
U.S. Appl. No. 18/612,108, filed Mar. 21, 2024.
U.S. Appl. No. 18/643,926, filed Apr. 23, 2024.
U.S. Appl. No. 18/828,146, filed Jan. 9, 2024.
U.S. Appl. No. 18/737,977, filed Jun. 8, 2024.
U.S. Appl. No. 18/765,282, filed Jul. 7, 2024.
U.S. Appl. No. 18/670,405, filed May 21, 2024.
U.S. Appl. No. 18/421,638, filed Jan. 24, 2024.
U.S. Appl. No. 18/643,867, filed Apr. 23, 2024.
U.S. Appl. No. 18/664,661, filed May 15, 2024.
U.S. Appl. No. 19/191,512, filed Apr. 28, 2025.

*Primary Examiner* — Anita Nassiri-Motlagh
(74) *Attorney, Agent, or Firm* — Robert E. Ridade

(57) ABSTRACT

The invention comprises a method of making lime, dolomitic lime, hydraulic cement such as portland cement clinker and co-products such as pozzolan, acids, alumina, silica and the like. The method comprises providing a natural calcium-iron-aluminosilicate mineral from one or more of hyaloclastite, lava, scoria, volcanic glass, volcanic ash, or any other mineral of a basaltic or intermediate chemical composition and reacting the hyaloclastite with a first hydrochloric acid to create a first salt, precipitating the calcium ions to react with $OH^-$ to form calcium hydroxide and heating the calcium hydroxide to create calcium oxide, alite and belite.

11 Claims, No Drawings

LIME AND HYDRAULIC CEMENT MANUFACTURE BY ELECTROLYSIS USING HYALOCLASTITE OR LAVA, CARBON MINERALIZATION BY HYALOCLASTITE OR LAVA ELECTROLYSIS AND METHOD OF MAKING AND USING SAME

CROSS-REFERENCE TO RELATED APPLICATIONS

The present application claims the benefit of application Ser. No. 63/644,637 filed M ay 9, 2024.

FIELD OF THE INVENTION

The present invention generally relates to the manufacture of lime, such as quick lime or dolomitic lime, and a hydraulic cement. The present invention also relates to an improved pozzolan. The present invention also relates to mineralizing $CO_2$ with the un-carbonated elements of hyaloclastite. The present invention further relates to separating the un-carbonated elements of hyaloclastite. The present invention also relates to the manufacture of microporous materials such as zeolites and metal-organic frameworks (MOFs) from the alumina, silica and other elements separated from the carbonatable elements of hyaloclastite. The present invention further relates to the extraction of the various elements separated from the carbonatable elements of hyaloclastite.

BACKGROUND OF THE INVENTION

Modern concrete is composed of one or more hydraulic cements, coarse aggregates, and fine aggregates. Optionally, modern concrete can include other cementitious materials, inert fillers, property modifying admixtures and coloring agents. The hydraulic cement is typically portland cement. However, other types of hydraulic cements can be made by using a small amount of lime to activate a reactive cementitious material such as a pozzolan. In the case of a lime activated concrete or mortar, the overall $CO_2$ emissions will be reduced; however, there will still be a significant amount of $CO_2$ emission associated with the current lime manufacturing process.

Lime manufacturing involves the process of calcining limestone, which is $CaCO_3$, where at high temperatures the $CO_2$ is released from the limestone thereby creating lime which is CaO. The lime manufacturing process generates significant amount of $CO_2$, in some cases up to 800 kg of $CO_2$ per ton of lime. In the case of dolomitic lime, the $CO_2$ emissions can be as high as 900 kg per ton of dolomitic lime cement. Most of the $CO_2$ is released during the calcining process where the limestone (calcium carbonate or calcium magnesium carbonate) releases $CO_2$ to create lime or dolomitic lime.

Thus, it would be desirable to produce lime, dolomitic lime or a hydraulic cement that releases reduced amounts of $CO_2$ during the manufacturing process.

Conventional carbon capture and storage is a costly and energy intensive process. The conventional carbon capture process uses amines to remove carbon dioxide from the flue gas of a combustion process such as power plants, cement manufacture and other combustion processes. It seems like all carbon capture processes are based on the premise of using some type of absorbent to capture the $CO_2$ and then de-sorb the $CO_2$ and reuse the absorbent again and again. However, the $CO_2$ desorption process generally requires a high temperature which is very costly both in capital investment and cost of operation. Once the $CO_2$ is captured, it is then compressed and transported either by pipeline or tank to a Level 6 underground geological storage well. Each phase of this process requires massive capital investment in installations and infrastructure as well as very high costs of operation. A less expensive process of removing carbon dioxide from a flue gas is by using zeolites, however natural zeolites suitable for this process are rare. While synthetic zeolites have been proposed to remove carbon dioxide from the flue gas this process has been envisioned to re-use the zeolites due to their costly manufacturing process among other things. It would be desirable to manufacture a low cost, highly absorbent microporous material to capture and store $CO_2$ without having to desorb and reuse such material or compound.

It would also be further desirable to separate useful elements contained in naturally occurring minerals and use such elements for various application and manufacturing processes.

SUMMARY OF THE INVENTION

The present invention satisfies the foregoing needs by providing a lime, dolomitic lime or hydraulic cement manufacturing process using a mineral containing calcium in a non-carbonated matrix and/or in combination with magnesium. The mineral also desirably includes alumina, silica and/or iron necessary to manufacture a pozzolan that can then be recombined with the lime to create a hydraulic cement to be used in concrete or mortars. As used herein, this mineral is referred to as a calcium-iron-aluminosilicate mineral that contains un-carbonated Ca and M g (usually in the form of CaO and MgO) in an amorphous or partially crystalline matrix or a combination thereof. A long with Ca and M g, the mineral can contain Al, Si and Fe, combined in an amorphous or partially crystalline form or a combination thereof. The calcium-iron-aluminosilicate mineral is preferably hyaloclastite.

The calcium-iron-aluminosilicate mineral is mixed with a first acid, such as carbonic, hydrochloric, acetic, sulfuric acid inside a flow through or electrochemical reactor or a combination of the two where the hyaloclastite elements such as calcium will be dissolved or out of the calcium-iron-aluminosilicate to form a first salt such as calcium chlorite and an iron-aluminosilicate such as an aluminosilicate pozzolan with a relatively high concentration of iron. The first salt, such as the calcium chlorite, is then further or concurrently electrolyzed so that calcium oxide or calcium hydroxide is obtained. The calcium oxide, which is quick lime, or calcium hydroxide, which is hydrated lime, can then be used in any current application that lime or hydrated lime is used. The calcium oxide or hydroxide can be further combined with alumina, silica and iron and be placed in a kiln to heat it through the clinker temperature stages to make a hydraulic cement clinker such as a portland cement clinker or any other type of calcium aluminosilicate cement. Similarly, a dolomitic lime can be obtained by the same acid dissolution process. In either case once the calcium and/or magnesium is dissolved or electrolyzed inside a flow through or electrochemical reactor, or a combination of the two, where out of the non-carbonated calcium-iron-aluminosilicate mineral calcium hydroxide and magnesium hydroxide and a new iron-aluminosilicate mineral will be produced whereby such mineral can be used as a pozzolan. Such pozzolan can be used in the manufacture of concrete or mortars either by combining it with any of the lime produced by the method above or by combining it with any other hydraulic cement such as slag cement, ordinary portland cement, or any other compound having an active hydroxyl group such as potassium hydroxide, sodium hydroxide and the like to create a cement that can be used in concrete or mortars. The un-carbonated Ca found in the calcium-iron-aluminosilicate mineral does not contributes any $CO_2$ emissions to the manufacture of the lime in accordance with this invention. In other words, the amount of Ca or CaO contained in the calcium-iron-aluminosilicate mineral replaces the CaO that would normally be produced from limestone calcination thereby eliminating the amount of $CO_2$ that would normally be generated by limestone calcination. Typically, a calcium-iron-aluminosilicate mineral contains approximately 4% to approximately 25% CaO which means that a lime or dolomitic lime made using the mineral of the present invention as a replacement for the limestone in the lime manufacturing process will eliminate the $CO_2$ emissions from the limestone calcination process in its entirety.

In another disclosed embodiment, the present invention comprises a process for mineralizing carbon dioxide. The process comprises placing hyaloclastite in a flow through or electrochemical reactor, or a combination of the two, where the elements are dissolved or electrolyzed resulting in one or more of calcium, magnesium, sodium, potassium or iron in a solution such as a salt, sulfite, hydroxide or halide compound form preferably a hydroxide. $CO_2$ is then fed into the reactor thereby combining with one or more of the carbonatable elements from the hyaloclastite to create simple or complex carbonate minerals.

In a further disclosed embodiment, the present invention comprises a process for separation carbonatable elements (compounds) of a calcium-iron-aluminosilicate mineral. The process comprise placing a calcium-iron-aluminosilicate mineral, such as hyaloclastite, in a first reactor where the hyaloclastite is mixed with water or steam at a temperature of approximately 50 to approximately 150° C., preferably approximately 60 to approximately 90° C., whereby a portion of the calcium, sodium, potassium and/or magnesium dissolve creating carbonatable hydroxide compounds, such as NaOH, KOH and/or $Mg(OH)_2$. The carbonatable hydroxides are then separated from undissolved calcium-iron-aluminosilicate mineral elements (compounds). Calcium hydroxide can also be separated from other hydroxides and used in a lime or hydraulic cement manufacturing process. Optionally, $CO_2$ can be combined with one or more of the carbonatable hydroxide-containing compounds to create simple or complex carbonates either inside or outside the reactor thereby mineralizing $CO_2$. The balance of the undissolved hyaloclastite elements are then removed from the first reactor and placed into a second reactor, preferably an electrochemical type reactor, where the balance of the elements are combined with an acid and further dissolved or electrolyzed resulting in one or more of calcium, magnesium, sodium, potassium or iron in a solution such as a salt, a sulfite, a hydroxide or a halide compound form, preferably a hydroxide. The undissolved portion from the hyaloclastite are then separated from the dissolved portion. The alumina, silica and optionally titanium compounds are separated and used to create a zeolite suitable for $CO_2$ absorption. Other undissolved compounds, such as metals or rare earth elements are further separated for various uses. Alternatively, each and every element (compound) or metal contained therein can be separated and used for various purposes. $CO_2$ is optionally fed into the reactor thereby combining with the hydroxyl groups associated with one or more of the carbonatable elements to create simple or complex carbonate minerals.

In another disclosed embodiment, the present invention comprises a process for the manufacture of lime, dolomitic lime or a hydraulic cement. The process comprises using a natural calcium-iron-aluminosilicate mineral within the chemical composition preferably comprises approximately 30 to approximately 57 percent by weight $SiO_2$, approximately 10 to approximately 18 percent by weight $Al_2O_3$, approximately 5 to approximately 18 percent by weight $Fe_2O_3$, and approximately 4 to approximately 25 percent by weight CaO and preferably wherein the sum of the $Al_2O_3 + Fe_2O_3$ is between approximately 20 to approximately 35 percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25, ideally approximately 1.5.

In another disclosed embodiment, the present invention comprises a process for the manufacture of lime, dolomitic lime or a hydraulic cement. The process comprises using a calcium-iron-aluminosilicate mineral from one or more of hyaloclastite, lava, gabbro, volcanic ash, scoria, tephra, pumice or any igneous or sedimentary mineral with a basaltic or intermediate basaltic chemistry in a partially amorphous state and electrolyzing it in an electrochemical reactor.

Accordingly, it is an object of the present invention to provide an improved lime, dolomitic lime or hydraulic cement manufacturing process that reduces or eliminates $CO_2$ emissions.

Another object of the present invention is to provide an improved lime or dolomitic lime manufacturing process that uses less energy when compared with current practices.

Another object of the present invention is to provide an improved hydraulic cement manufacturing process that reduces or eliminates $CO_2$ emissions.

Yet another object of the present invention is to provide an improved a concrete or mortar manufacturing process that reduces or eliminates $CO_2$ emissions.

Another object of the present invention is to provide a process for the mineralization of carbon dioxide. The process comprises placing a calcium-iron-aluminosilicate mineral, such as hyaloclastite, in a flow through or electrochemical reactor thereby dissolving the un-carbonated elements (compounds) from the hyaloclastite and adding $CO_2$ to the process where the $CO_2$ reacts with one or more of the un-carbonated elements (compounds) to create a carbonated mineral. Undissolved/unreacted elements (compounds), such as metal hydroxides or oxides, are separated from the dissolved elements (compounds).

In a further disclosed embodiment, the present invention compromise a process to manufacture a low cost highly absorbent microporous material to capture and store $CO_2$ without having to desorb $CO_2$ and reuse such material or compound and then use it to mineralize carbon dioxide using a mineral containing carbonatable elements thereby permanently removing carbon from the environment while at the same time said mineral contains elements suitable to manufacture a $CO_2$ absorbent material.

A further object of the present invention is to provide a process for producing man-made zeolites or metal-organic frameworks (MOFs) suitable for $CO_2$ absorption and/or removal from combustion gas flue. The process comprises separation alumina, silica and optionally titanium compounds from a calcium-iron-aluminosilicate mineral, such as hyaloclastite, and using them to create a zeolite suitable for $CO_2$ absorption.

A most important object of the present invention is to provide a carbon capture and mineralization process that significantly reduces the cost of carbon capture and storage by capturing and mineraling $CO_2$ thereby permanently removing $CO_2$ from the environment.

Yet another object of the present invention is to provide a process that comprises separation of other minor elements or compounds contained within the matrix of a calcium-iron-aluminosilicate mineral from the major constituents of the mineral and use such elements for various applications and manufacturing processes known in the art.

These and other objects, features and advantages of the present invention will become apparent after a review of the following detailed description of the disclosed embodiments and the appended claims.

DETAILED DESCRIPTION OF THE DISCLOSED EMBODIMENTS

Hyaloclastite is a hydrated tuff-like breccia typically rich in black volcanic glass, formed during volcanic eruptions under water, under ice or where subaerial flows reach the sea or other bodies of water. It has the appearance of angular fragments sized from approximately a millimeter to a few centimeters. Larger fragments can be found up to the size of pillow lava as well. Several minerals are found in hyaloclastite masses including, but not limited to, sideromelane, tachylite, palagonite, olivine, pyroxene, magnetite, quartz, hornblende, biotite, hypersthene, feldspathoids, plagioclase, calcite and others. Fragmentation can occur by both an explosive eruption process or by an essentially nonexplosive process associated with the spalling of pillow basalt rinds by thermal shock or chill shattering of molten lava. The water-quenched basalt glass is called sideromelane, a pure variety of glass that is transparent, and lacks the very small iron-oxide crystals found in the more common opaque variety of basalt glass called tachylite. In hyaloclastite, these glassy fragments are typically surrounded by a matrix of yellow-to-brown palagonite, a wax-like substance that forms from the hydration and alteration of the sideromelane and other minerals. Depending on the type of lava, the rate of cooling and the amount of lava fragmentation, the particle of the volcanic glass (sideromelane) can be mixed with other volcanic rocks or crystalline minerals, such as olivine, pyroxene, magnetite, quartz, plagioclase, calcite and others.

Hyaloclastite is usually found within or adjacent subglacial volcanoes, such as tuyas, which is a type of distinctive, flat-topped, steep-sided volcano formed when lava erupts under or through a thick glacier or ice sheet. Hyaloclastite ridges are also called tindars and subglacial mounds are called tuyas or mobergs. They have been formed by subglacial volcanic eruptions during the last glacial period. A subglacial mound is a type of subglacial volcano. This type of volcano forms when lava erupts beneath a thick glacier or ice sheet. The magma forming these volcanoes was not hot enough to melt a vertical pipe through the overlying glacial ice, instead forming hyaloclastite and pillow lava deep beneath the glacial icefield. Once the glacier retreated, the subglacial volcano was revealed, with a unique shape as a result of its confinement within the glacial ice. Subglacial volcanoes are somewhat rare worldwide, being confined to regions that were formerly covered by continental ice sheets and also had active volcanism during the same period. Currently, volcanic eruptions under existing glaciers may create hyaloclastite as well. Hyaloclastite tuff-like breccia is a pyroclastic rock comprised of glassy juvenile clasts contained in a fine-grained matrix dominated by glassy shards. Hyaloclastite breccias are typically products of phreatomagmatic eruptions in particular associated with the eruption of magmas into bodies of water and form by fragmentation of chilled magma. They are often formed from basaltic magmas and are associated with pillow lavas and sheet flows. In addition, any other type of lava, such as intermediate, andesitic, dacitic and rhyolitic, can form hyaloclastite under similar rapid cooling or quenching conditions.

Sometimes a subglacial or subaquatic eruption may produce a release of volcanic ashes that are ejected into the atmosphere which can then land back on the ground. At times a fine volcanic particle size may be called a "volcanic ash" by different professionals in the geological field even though the ash definition may be debatable. It is also possible that a subglacial or subaquatic eruption may have been produced by a magma with high volume of gas entrapped in the lava. The high volume of gas exsolution may create a mineral with very high porosity or vesicular structure and bulk density similar to scoria or pumice.

Volcanic or metamorphic calcium-magnesium-iron-aluminosilicate minerals, such as hyaloclastite, lava, scoria, volcanic ash, tephra or pumice, can be classified based on the amount of silica content as: basaltic (less than 53% by weight $SiO_2$), intermediate (approximately 53-57% by weight $SiO_2$), or silicic such as andesitic (approximately 57-63% by weight $SiO_2$), dacitic (approximately 63-69% by weight $SiO_2$), or rhyolitic (greater than 69% by weight $SiO_2$). However, for the purpose of this invention the basaltic range starts at 40% $SiO_2$ and the andesitic range ends at 65% $SiO_2$.

Basaltic hyaloclastite, lava, scoria, volcanic ash or pumice contains generally 40% to 53% by weight silica ($SiO_2$) contained in an amorphous or crystalline form or a combination thereof essentially calcic plagioclase feldspar and pyroxene (usually Augite), with or without olivine. In addition to silica, basaltic hyaloclastite, volcanic ash or pumice generally comprises approximately 10 to approximately 18 percent by weight $Fe_2O_3$, approximately 6 to approximately 18 percent by weight CaO, approximately 5 to approximately 15 percent by weight MgO and other elements in various percentages. Intermediate basaltic hyaloclastite, volcanic ash or pumice generally comprises approximately 53 to approximately 57 percent by weight silica ($SiO_2$) content. In addition to silica, intermediate basaltic hyaloclastite, volcanic ash or pumice generally comprises approximately 5 to approximately 10 percent by weight $Fe_2O3$, approximately 6 to approximately 10 percent by weight CaO, approximately 3 to approximately 10 percent by weight MgO and other elements in various percentages. Basaltic hyaloclastite, volcanic ash or pumice may also contain quartz, hornblende, biotite, hypersthene (an orthopyroxene) and feldspathoids. The average specific density of basaltic hyaloclastite, volcanic ash or pumice is approximately 2.7-3.0 gm/cm³.

There are several types of hyaloclastites, such as andesitic, dacitic and rhyolitic hyaloclastites. However, the present invention preferably uses basaltic hyaloclastite and intermediate basaltic hyaloclastite.

There are different types of calcium-iron-aluminosilicates minerals useful in the present invention. Such minerals contain varying amounts of uncarbonated elements (compounds); i.e., Ca, Mg, K, Na and Fe, in various forms, such as oxides, that are available to be dissolved or leached out from the calcium-iron-aluminosilicate mineral as part of the manufacturing process in accordance with the present invention. As an example, a calcium-iron-aluminosilicate mineral, such as hyaloclastite, lava, gabbro, scoria, volcanic ash, tephra or pumice classified based on the amount of silica content comprises the following: basaltic hyaloclastite, volcanic ash, tephra or pumice (less than approximately 53% by weight $SiO_2$) comprises CaO of approximately 4 to approximately 24% by weight, MgO approximately 2% to approximately 15% by weight, $K_2O$ 0% to approximately 5% by weight, $Na_2O$ 0% to approximately 3% by weight and $Fe_2O_3$ approximately 5% to approximately 18% by weight; intermediate basaltic hyaloclastite, volcanic ash or pumice (approximately 53% to approximately 57% by weight $SiO_2$) comprises CaO of approximately 3% to approximately 10% by weight, MgO approximately 3% to approximately 10% by weight, $K_2O$ 0% to approximately 5% by weight, $Na_2O$ approximately 1% to approximately 5% by weight and $Fe_2O_3$ approximately 5% to approximately 10% by weight;

As used herein, the term "calcium-iron-aluminosilicate mineral" means hyaloclastite, lava, gabbro, volcanic ash, scoria, tephra, pumice from any and all sources; i.e., all irrespective of the mineral source from which it is derived, either igneous or metamorphic, unless otherwise designated, with an amorphous content of approximately 5% to 95% by weight and a crystalline content of approximately 5% to approximately 95% by weight wherein the crystalline matrix is comprised of micro-crystals where one or more of the calcium, magnesium, sodium, potassium or iron is in an un-carbonated state.

Basaltic or mafic hyaloclastite, volcanic ash, tephra or pumice generally has approximately 4% to approximately 18% by weight uncarbonated calcium found with the amorphous matrix or a combination of amorphous and micro crystalline matrix. As the amount of $SiO_2$ increases from a low of approximately 40% by weight for basaltic hyaloclastite, volcanic ash, scoria or pumice to the andesitic and dacitic silica range, the uncarbonated calcium, magnesium, iron decreases to where in the rhyolitic range there is virtually no uncarbonated calcium available. The amount of sodium and potassium varies and it is not important to the present invention but generally may increase as the amount of silica increases. Therefore, the dacitic and rhyolitic mineral chemistries are not desirable minerals to be used in the manufacture of lime or hydraulic cement in accordance with the present invention. Tables 1-2 below show chemical oxide analysis of calcium-iron-aluminosilicate minerals, such as hyaloclastite, volcanic ash, or pumice-based minerals, from various sources and shows CaO and MgO levels as well as the $Fe_2O_3$ and $Al_2O_3$, correlated with the $SiO_2$ content. The values of the Ca, M g, Fe, N a and K oxides shown in Table 1 below are examples of desirable calcium levels for lime and hydraulic cement production as well as $CO_2$ mineralization in accordance with the present invention.

TABLE 1

Desirable chemical compositions of calcium-iron-aluminosilicate minerals suitable for lime and hydraulic cement production, $CO_2$ mineralization and $CO_2$ absorbent microporous materials

| Elements | LS36-10 | TDR | SND | AB | BKP | PVT | RDF | THR | VCR | PTR |
|---|---|---|---|---|---|---|---|---|---|---|
| $SiO_2$ | 45.20 | 45.00 | 47.70 | 47.20 | 46.36 | 48.50 | 50.60 | 52.85 | 54.94 | 60.39 |
| $Al_2O_3$ | 14.09 | 17.60 | 15.33 | 12.49 | 11.96 | 15.40 | 15.00 | 14.53 | 14.87 | 13.05 |
| Total $SiO_2$, $Al_2O_3$ | 59.29 | 62.60 | 63.03 | 59.69 | 58.32 | 63.90 | 65.60 | 67.38 | 69.81 | 73.44 |
| CaO | 14.77 | 12.70 | 11.51 | 11.51 | 9.68 | 9.37 | 9.16 | 8.94 | 8.84 | 6.69 |
| MgO | 6.11 | 7.27 | 10.89 | 11.06 | 5.50 | 6.57 | 7.78 | 4.94 | 4.93 | 6.37 |
| FeO | 13.07 | 12.90 | 12.75 | 12.04 | 15.38 | 13.00 | 10.20 | 12.03 | 9.85 | 7.21 |
| Total CaO, MgO, FeO | 33.95 | 32.87 | 35.15 | 34.61 | 30.56 | 28.94 | 27.14 | 25.91 | 23.62 | 20.27 |
| $Na_2O$ | 3.22 | 1.83 | 1.58 | 1.72 | 2.60 | 3.40 | 3.34 | 2.69 | 2.63 | 2.23 |
| $K_2O$ | 1.12 | 0.21 | 0.21 | 0.40 | 0.70 | 1.14 | 1.48 | 0.76 | 0.86 | 2.27 |
| Total Alkali | 4.34 | 2.04 | 1.79 | 2.12 | 3.30 | 4.54 | 4.82 | 3.45 | 3.49 | 4.50 |

TABLE 2

Desirable chemical composition of calcium-iron-aluminosilicate minerals showing the desired ratios between various elements and sums of various elements

| Sample ID | CaO | MgO | $Al_2O_3$ | $Fe_2O_3$ | $SiO_2$ | Ratio $SiO_2$ to $Al_2O_3$ | Ratio $Al_2O_3$ to $Fe_2O_3$ | Ratio $SiO_2$ to Sum ($Al_2O_3$ + $Fe_2O_3$) | Sum $Al_2O_3$ + $SiO_2$ + $Fe_2O_3$ (%) | Sum $Al_2O_3$ + $Fe_2O_3$ (%) |
|---|---|---|---|---|---|---|---|---|---|---|
| LS36-10 | 14.77% | 6.11% | 14.09% | 13.07% | 45.20% | 3.21 | 1.08 | 1.66 | 72.36% | 27.16% |
| TDR | 12.70% | 7.27% | 17.60% | 12.90% | 49.50% | 2.81 | 1.36 | 1.62 | 80.00% | 30.50% |
| SND | 11.51% | 10.89% | 15.33% | 12.75% | 48.90% | 3.19 | 1.2 | 1.74 | 76.98% | 28.08% |
| AB | 11.51% | 11.06% | 12.49% | 14.20% | 47.20% | 3.78 | 0.88 | 1.77 | 73.89% | 26.69% |
| BKP | 9.68% | 6.57% | 11.96% | 15.38% | 46.36% | 3.88 | 0.78 | 1.7 | 73.70% | 27.34% |
| PVT | 9.37% | 6.57% | 15.40% | 13.00% | 48.50% | 3.15 | 1.18 | 1.71 | 76.90% | 28.40% |
| RDF | 9.16% | 7.78% | 15.00% | 14.10% | 50.60% | 3.37 | 1.06 | 1.74 | 79.70% | 29.10% |
| THR | 8.94% | 4.94% | 14.53% | 12.03% | 52.85% | 3.64 | 1.21 | 1.99 | 79.41% | 26.56% |
| VCR | 8.84% | 4.93% | 14.87% | 9.85% | 54.94% | 3.69 | 1.51 | 2.22 | 79.66% | 24.72% |
| PTR | 6.69% | 6.37% | 13.05% | 7.21% | 60.39% | 4.63 | 1.81 | 2.98 | 80.65% | 20.26% |

All examples above are minerals sampled, processed and analyzed by the inventor from various location around the world. The three-letter designation refers to the mineral source. In the examples in Table 2 above, all samples except the PTR sample show desirable properties for use as a calcium-iron-aluminosilicate mineral to be used for the manufacture of lime or hydraulic cement or co-products such as pozzolans, alumina, silica, zeolites and the like in accordance with the present invention.

These examples of a calcium-iron-aluminosilicate mineral show adequate amounts of calcium, alumina, iron and silica needed in the manufacture of lime, dolomitic lime, hydraulic cement or the by-products such as pozzolan, alumina, iron or silica. Of relevance is the Al to Fe ratio ($Al_2O_3/Fe_2O_3$) preferably close to 1 and more preferably approximately 0.75 to approximately 1.5 signifying that the use of this material will not increase both the amount of tricalcium aluminate (C3A) in clinker and the associated durability risks in the presence of sulfate environments in concrete applications. Additionally, the high $Fe_2O_3$ concentration will promote melt phase formation at lower temperature, in the later stages of the manufacturing process in accordance with the present invention, ny acting as a flux, therefore improving burnability and reducing dusting at the kiln inlet as well as reducing the kiln processing time. This in turn reduces energy consumption and increases the output of the clinker production line.

It is also important to have a relatively low Si ratio to the sum of Fe and Al ($SiO_2/(Fe_2O_3+Al_2O_3)$) preferably of approximately 1.5, or more preferably approximately 1.25 to approximately 2.25 which will improve burnability as well and promote formation of tricalcium silicate (C3S) vs dicalcium silicate (C2S) in clinker in the final stage of this process if clinker production is desired. The improvement of burnability will decrease specific energy consumption of clinker burning, hence decreased $CO_2$ and NOx emissions from burning less fuel.

It is important to note that these samples have desirable silica to alumina ratios (Si/Al) to manufacture microporous materials such as a zeolites or metal-organic frameworks (MOFs) suitable to absorb $CO_2$. From the alumina and silica fraction of the hyaloclastite mineral composition after the carbonatable elements (compounds) have been removed or separated. To manufacture a suitable carbon dioxide absorbent zeolite or MOF, it is important to have an optimal Si to Al ratio ($SiO_2/Al_2O_3$) preferably between approximately 2.5 and approximately 4, more preferably approximately 3 to approximately 3.5. This ratio is important for designing a zeolite or MOF that can absorb $CO_2$ from a gas combustion flue at low pressure or any other types of $CO_2$ source. The Si/Al ratio of zeolites has a large influence on the adsorption capacity and selectivity of polar and polarizable molecules. Zeolites with low Si/Al ratios have a higher content of Al and, therefore, a higher amount of extra framework cations, which are commonly the active sites for adsorption. This means that the amount of adsorption sites per unit mass of material increases by decreasing the Si/Al ratio, thus leading to an increase in the $CO_2$ adsorption capacity of the zeolite. Silicoaluminate zeolites also contain Lewis base sites stemming from the O atoms adjacent to Al atoms. Therefore, the amount of these basic sites per unit mass of zeolite increases with the content of Al. The basic sites in zeolites can interact with the acidic $CO_2$ molecule, which means that the adsorption capacity and selectivity toward $CO_2$ due to these sites is higher for lower Si/Al ratios. In line with these considerations, several articles report that in general the $CO_2$ adsorption capacity of zeolites increases upon lowering the Si/Al ratio. However, the Si/Al ratio also affects the available pore volume of the zeolite because for each Al-site a cation is present. Especially for zeolites with low Si/Al ratio, and thus a high number of cations per unit mass, the steric hindrance of the cations can negatively affect the adsorption capacity. For example, zeolite LTA with a Si/Al=1 has been reported to have a lower adsorption capacity (at 5 bar) than zeolite LTA with a Si/Al ratio of 2, 3.5 or 5, and this behavior has been attributed to the reduced available pore volume in the zeolite with Si/Al=1.108. These results are in accordance with computational simulations, which suggest that the Si/Al ratio at low pressures has a significant influence on the adsorption capacity, while its effect is less substantial at higher pressures (and the adsorption isotherms may converge) due to saturation of the active sites. All examples above show desirable Si to Al ratios for the manufacture of zeolites suitable for carbon dioxide adsorption and removal from gas flue in accordance with the present invention.

The calcium-iron-aluminosilicate mineral used in accordance with the present invention must also contain significant amounts of CaO, preferably approximately 4% to approximately 25% by weight, most preferably as un-carbonated Ca, or a combination of un-carbonated and carbonated Ca, thus proportionally reducing or eliminating $CO_2$ emissions from the manufacturing process.

The same approach applies for MgO content, if desired to make a dolomitic lime a high MgO content is desired or additional amount of carbon dioxide is to be mineralized.

Additionally, the greater the sum of the carbonatable elements such as Ca, M g, N a, K and potentially Fe contained in the hyaloclastite the more carbon dioxide can be mineralized in accordance with the present invention.

Mineralogy XRD data confirms some of the above mentioned, namely practical absence of quartz. The absence of quartz has an additional positive impact, in conjunction with the sandy nature of the quartz material used in current practice. Quartz is a hard mineral requiring high and specific grinding energy in raw meal production. The calcium-iron-aluminosilicate mineral contains CaO that is distributed between amorphous, optionally carbonates and/or feldspars, which in turn will contribute to decreasing or eliminate $CO_2$ emissions during the manufacturing process.

The first three samples in Table 1 and 2 above, L536-10, TDR and SN D, show a basaltic chemistry with the CaO content of approximately 11-14%, MgO content of approximately 6-11%, $SiO_2$ of approximately 45-47% and $Al_2O_3$ of 14-17.6% this results in a total silica and alumina content of 59.29-63.03%, and a total amount of uncarbonated calcium, magnesium and iron oxides of approximately 32-35%.

The next three samples, AB, BKP and PVT, have similar basaltic chemical composition of CaO content of approximately 9-11%, MgO content of approximately 5-11% total silica and alumina content of 59.69-63.9% and a total amount of uncarbonated calcium, magnesium and iron oxides of 28.94-34.61%.

The next two samples, RDF and TH R, have similar basaltic chemical composition of CaO content of approximately 9%, MgO content of approximately 5-8%, total silica and alumina content slightly higher of 65.6-67.38% and a total amount of uncarbonated calcium, magnesium and iron oxides of 25.91-27.14%.

The next sample, VCR, has an intermediate chemical composition of CaO content of approximately 8.84%, MgO content of approximately 4.93%, and total silica and alumina slightly higher of 69.81%

The last sample, PTR, has an andesitic chemical composition of CaO content of approximately 6.69%, MgO content of approximately 6.37%, and total silica and alumina slightly higher of 73.44%

Chemical compositions as reported herein are measured by the XRF (X-ray fluorescence) method. This is a non-destructive analytical technique used to determine the elemental composition of materials. XRF analyzers determine the chemistry of a sample by measuring the fluorescent (or secondary) X-ray emitted from a sample when it is excited by a primary X-ray source. Each of the elements present in a sample produces a set of characteristic fluorescent X-rays ("a fingerprint") that is unique for that specific element, which is why XRF spectroscopy is an excellent technology for qualitative and quantitative analysis of material composition. The chemical analysis reported herein is the total oxides scan. All percentages reported herein are by weight.

Sample preparation for XRF can be achieved using either of two distinct methods: a pressed powder and a fused glass disk. Pressed powder specimens are typically ground in a tungsten carbide ring and puck mill with a binding agent to reduce the particle size and provide a packed powder mount that will remain intact for transport and analysis. The advantages of this preparation method include the simplicity and better detection limits while disadvantages include what is known as the "mineralogical effect", which requires a similar matrix between a bracketed calibration and unknown specimens for the calibrations to be valid.

In case of the calcium-iron-aluminosilicate mineral such as hyaloclastites, lava, gabbro, scoria, volcanic ashes, tephra, pumice, etc., they may contain some degree of crystalline elements, the calcium, iron, alumina, silicates, and other elements are contained in micro-crystals, such as clinopyroxene $Ca(Mg,Fe,Al,Ti)(Si,Al)_2O_6$, calcium plagioclase feldspars $(Na,Ca)Al(Si,Al)_3O_8$, olivine $(Fe,Mg)_2SiO_4$ are examples of crystalline materials that contain uncarbonated elements, such as calcium, magnesium, potassium, sodium and iron, that are available to be leached out or dissolved by a first acid, to manufacture lime, dolomitic lime, hydraulic cement or co-products such as pozzolan, alumina, silica and the like in accordance with this present invention. The calcium, iron, aluminum, silica elements, and others, can be found in metamorphic rocks, lava, gabbro, scoria, volcanic ashes, tephra, pumices and hyaloclastites of these chemistries can be in partially amorphous or partially microcrystalline form or a combination thereof.

Table 3 below shows samples of calcium-iron-aluminosilicate such as hyaloclastites, lava, volcanic ashes, tephra or pumices that contain various amounts of amorphous and crystalline content. Samples 14 and 15 are rhyolitic glass such as perlite and the CaO content is below 1% compared with the basaltic in Samples 1-13 where CaO ranges between 9-16%.

TABLE 3

| | "Amorphous" | Clinopyroxene Ca(Mg, Fe, Al, Ti) (Si, Al)2O6 | Plagioclase Feldspar (Na, Ca)Al (Si, Al)3O8 | Olivine (Fe, Mg) 2SiO4 | Calcite | Unidentified |
|---|---|---|---|---|---|---|
| 1 | >70 | — | 12 | 5 | 7 | <5 |
| 2 | >80 | — | 10 | <5 | — | <5 |
| 3 | >70 | <3? | 11 | <5 | — | <5 |
| 4 | >80 | — | 13 | <3 | — | <5 |
| 5 | >55 | — | 12 | 5 | 20 | <5 |

TABLE 3-continued

| | "Amorphous" | Clinopyroxene Ca(Mg, Fe, Al, Ti) (Si, Al)2O6 | Plagioclase Feldspar (Na, Ca)Al (Si, Al)3O8 | Olivine (Fe, Mg) 2SiO4 | Calcite | Unidentified |
|---|---|---|---|---|---|---|
| 6 | >70 | — | 11 | 5 | <5 | <5 |
| 7 | >75 | — | 10 | 5 | — | <5 |
| 8 | >65 | — | 15 | 5 | <5 | <5 |
| 9 | >70 | <3? | 12 | 5 | | <5 |
| 10 | >30 | 25 | 43 | 5 | | <5 |
| 11 | >55 | | 15 | 5 | 15 | <5 |
| 12 | >40 | 17 | 37 | 4 | 1 | <5 |
| 13 | >70 | — | 15 | 8 | | <5 |
| 14 | >95 | | | | | <5 |
| 15 | >95 | | | | | <5 |

Samples 1 to 13 in Table 3 above have desirable compositions for use in accordance with the present invention for manufacturing lime, dolomitic lime or hydraulic cement and other co-products such as pozzolan, alumina, silica, $CO_2$ absorbent microporous materials, $CO_2$ mineralization and the like.

In one disclosed embodiment of the present invention, the calcium-iron-aluminosilicate mineral is ground to a powder like and combined with a first acid, such as carbonic, hydrochloric, sulfuric, acetic or the like acid to create a first salt, such as a salt, halide or hydroxide compound form such as a calcium chlorite or calcium hydroxide and optionally a magnesium chlorite salt or such as magnesium hydroxide, for the manufacture of lime, dolomitic lime, hydraulic cement and other co-products such as pozzolan, alumina, silica and the like, such as hyaloclastite, lava, gabbro, scoria, volcanic ash or pumice, or any other igneous or metamorphic rock, calcium-iron-aluminosilicate mineral within the chemical composition preferably comprises approximately 30 to approximately 57 percent by weight $SiO_2$, approximately 10 to approximately 18 percent by weight $Al_2O_3$, approximately 8 to approximately 18 percent by weight $Fe_2O3$, and approximately 4 to approximately 25 percent by weight CaO and preferably wherein the sum of the $Al_2O_3$+ $Fe_2O_3$ is between approximately 20 to approximately 35 percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25, ideally approximately 1.5.

In addition to the foregoing, other compounds can be present in small amounts, such as $K_2O$, $TiO_2$, $P_2O_5$, MnO, various metals, rare earth, trace elements and other unidentified elements. Additionally, minor amounts of other elements may be found in the hyaloclastite composition. Examples of such elements are: rare earths, barium, chromium, cobalt, copper, molybdenum, nickel, titanium, tin, vanadium, thorium, tungsten, zinc, strontium, zirconium, rubidium, yttrium among others. When combined, these other elements represent less than 10% by weight of the total chemical composition of the calcium-iron-aluminosilicate mineral such as hyaloclastite, lava, gabbro, scoria, volcanic ash, tephra or pumice mineral.

In another disclosed embodiment, the hyaloclastite, volcanic ash or pumice in accordance with the present invention preferably has a density or specific gravity of approximately 2.4 to approximately 3.1.

The calcium-iron-aluminosilicate mineral in accordance with the present invention can be in crystalline, microcrystalline or amorphous (glassy) form and is usually found as a combination thereof in varying proportions. Preferably, the hyaloclastite, lava, volcanic ash or pumice in accordance with the present invention comprises approximately 5% to approximately 97% by weight amorphous form, more preferably approximately 5% to approximately 95% by weight amorphous form, more preferably approximately 10% to approximately 80% by weight amorphous form, most preferably approximately 20% to approximately 60% by weight amorphous form, especially approximately 30% to approximately 50% by weight amorphous form. The crystalline portion of the calcium-iron-aluminosilicate mineral in accordance with the present invention, such as hyaloclastite, lava, scoria tephra or pumice preferably comprises approximately 3% to approximately 95% crystalline form, microcrystalline form or combinations and mixtures thereof, more preferably approximately 5% to 95% by weight crystalline form, microcrystalline form or combinations and mixtures thereof, wherein the crystalline or microcrystalline portion is optionally one or more of approximately 3% to approximately 20% by weight olivine, approximately 5% to approximately 40% by weight clinopyroxene, approximately 5% to approximately 60% by weight plagioclase, and approximately 0% to approximately 40% (or less than 40%) by weight other minerals including, but not limited to, magnetite, UlvoSpinel, quartz, feldspar, pyrite, illite, hematite, chlorite, calcite, hornblende, biotite, K-feldspars, mordenite, clinoamphibole, ilmenite hypersthene (an orthopyroxene), feldspathoids sulfides, metals, rare earth minerals, other unidentified minerals and combinations thereof. The foregoing ranges include all of the intermediate values. It is specifically desired to have a combination of amorphous and crystalline structure where when dissolved the elements contained in the amorphous state dissolve first and leave behind the crystalline structure or lattice that can be used to manufacture in part or in whole a three-dimensional zeolite.

The calcium-iron-aluminosilicate mineral particle size in either dry powder or wet suspension or dispersion preferably has a volume-based mean particle size of less than or equal to approximately 200 µm, more preferably less than or equal to approximately 100 µm, most preferably less than or equal to approximately 60 µm, especially approximately 40 µm, more especially approximately 20 µm, most especially less than or equal to 16 µm, most preferably less than or equal to 12 µm, especially less than or equal to 10 µm, more especially less than or equal to 8 µm and most especially less than or equal to 4 µm. The smaller the particle size for the calcium-iron-aluminosilicate mineral particle size in either dry powder or wet suspension or dispersion, the greater the surface area of contact with the dissolving solution. However, there are economic limits for grinding rock to small particle sizes. Those limits are well known by those skilled in the art. The calcium-iron-aluminosilicate mineral particle size in either dry powder or wet solution, preferably has a Blaine value of approximately 1,000 to approximately 10,000, more preferably approximately 3,500 to approximately 10,000, most preferably approximately 4,500 to approximately 10,000, especially approximately 6,000 to approximately 10,000. The calcium-iron-aluminosilicate mineral particle size in either dry powder or wet solution, preferably has a Blaine value of greater than or equal to approximately 10,000. The foregoing ranges include all of the intermediate values. As calcium-iron-aluminosilicate mineral can be ground in a ball mill, a vertical mill, a micronizing mill and the like in a dry or wet process. Such grinding equipment is well known in the art. If the hyaloclastite mineral is reduced in size using a wet process the water can be energized, electrolyzed oxidized (EO) or ionized water and kept at an elevated temperature. The water used in the wet milling process can also be combined with a weak acid or base and/or any other grinding aid or mineral dissolution aid or any other compound that can facilitate the manufacture of one or more of the products, co-products or compounds disclosed in the present invention. In doing so the hyaloclastite dissolution process can start or be prepared during the hyaloclastite milling process.

In one disclosed embodiment, hyaloclastite reduced in size is placed in a first reactor, mixed with water or steam at a temperature of approximately 50 C to approximately 150° C., preferably between approximately 60 C and approximately 90° C., most preferably approximately 70° C., whereby a portion of the calcium, sodium, potassium and potentially magnesium dissolve in the hot water creating carbonatable hydroxide groups. The water may be energized, electrolyzed oxidized (EO) or ionized water. Optionally, the water can contain a weak acid. The hot water dissolution of alkaline metals results in an alkaline solution. The carbonatable hydroxides are then separated from the balance of the undissolved/unreacted hyaloclastite elements contain therein which can then be used for various purposes. The separation methods for removing the dissolved Ca, Na, K and optionally Mg are known in the industry and may be membrane types, diaphragms, separators, precipitation or separation methods, or any other method to separate different types of chemical solutions of this type. Calcium hydroxide can be separated and used in the lime or hydraulic cement manufacturing process as described in the present invention. Any one or more of the hydroxides dissolved by this process can be removed from the reactor to be used for any purpose. $CO_2$ may be combined with one or more of the hydroxides, such as $Ca(OH)_2$, NaOH, etc. to create simple or complex carbonate minerals either inside or outside the reactor thereby mineralizing $CO_2$. Optionally, if the first reactor is an electrochemical reactor the hydroxide groups can agglomerate at the anode while the hydrogen flow to the cathode aids in the removal or separation process. It is also possible that metal oxides result from the dissolution process described above. Metal oxides can be separated and combined with $CO_2$ to create carbonates or be separated and used for any other suitable application.

The balance of the undissolved hyaloclastite elements, still possibly containing some carbonatable elements such as M g, is then removed from the first reactor and placed into a second reactor, preferably but not necessarily an electrochemical reactor. The temperature of the solution in the second reactor can be lower or higher although is preferably lower than the temperature in the first reactor. The balance of the hyaloclastite elements are then combined with an acid and further dissolved and/or electrolyzed resulting in possibly one or more of calcium, magnesium, sodium, potassium or iron in a solution such as a salt, sulfite, hydroxide or halide compound form such as a hydroxide and the further balance of elements that do not combine to form a salt, hydroxide or halide are then separated. The carbonatable hydroxides are then separated from the balance of the undissolved hyaloclastite elements contain therein and used for various purposes. Calcium hydroxide can be separated and used in the lime or hydraulic cement manufacturing process. $CO_2$ may be combined with one or more of the hydroxides to create simple or complex carbonates either inside or outside the reactor thereby mineralizing $CO_2$. In particular the alumina, silica and optionally titanium elements or oxides are separated and used to create a zeolite suitable for $CO_2$ absorption. The further balance of remaining elements such as one or more metals and/or rare earth elements are further separated for various uses. Alternatively, each element or metal found in an elemental, oxide or salt form contained therein can be separated from the solution in the second reactor and used for any suitable purpose. As an example, metals suitable for the manufacture of metal-organic frameworks can be separated for that purpose and combined with the organic compounds necessary to create the frameworks. The carbonatable hydroxides can be removed from the reactor and combined with $CO_2$. $CO_2$ can be combined with one or more of the hydroxides to create simple or complex carbonate minerals either inside or outside the reactor thereby mineralizing $CO_2$. $CO_2$ can also be optionally fed into the reactor thereby reacting with one or more of the carbonatable hydroxides to create simple or complex carbonates, such as $NaCO_3$. The carbonatable hydroxides can be removed from the reactor by any method known in the art for separating such chemical compositions. Membranes, diaphragms, precipitation and other means of separation can be used. Optionally, if the second reactor is an electrochemical reactor the hydroxides can agglomerate at the anode while the hydrogen flows to the cathode. Any type of reactor, separating membranes, electrodes or installations known in the art and designed for processing similar type solutions can be used. It is also possible that metal oxides result from the dissolution process described above. Metal oxides can be separated and combined with $CO_2$ to create carbonates or be separated and used for any other suitable application.

Alternatively, the process described above using a first reactor followed by a second reactor can be combined into one reactor or a flow through process reactor with multiple chambers. The water and acid can be combined into one weak acid. The water may be energized, electrolyzed oxidized (EO) or ionized water. In one embodiment, hyaloclastite reduced in size in accordance with the present invention and with an amorphous and crystalline composition disclosed in the present invention can be combined with water and heated to a temperature between approximately 50 C and approximately 150° C., more preferably between approximately 60 C and approximately 90° C. Alternatively, it may be combined with hot water or steam of temperature within the same range. Optionally, the hot water can contain a weak acid. The reduced hyaloclastite size coupled with the water or acid at elevated temperature causes elemental breakdown into a solution where at least some elements such as calcium, sodium, potassium and possibly magnesium will dissolve or leach out from the remaining elements found in the hyaloclastite matrix combining with $OH^-$ creating hydroxyl groups, such as $Ca(OH)_2$, Na H, KOH and $Mg(OH)_2$. The use of water or weak acid at elevated temperatures can reduce or eliminate the use of a first acid to dissolve the hyaloclastite into its elemental components. The balance of the hyaloclastite elements may be found dissolved in the solution may be in a form such as an oxide or as a salt.

Since the calcium-iron-aluminosilicate is fully or partially amorphous, the amorphous portion of the mineral matrix can dissolve in a base or alkaline solution of various pH values. Therefore, optionally the acid or weak acid described in the processes above can be substituted with a base or a weak base at any one or more of the steps of the mineral dissolution or elemental separation described in the present invention. In a possible Step 1, the reduced in size hyaloclastite can be combined with an alkaline or base solution resulting first in the dissolution of the elements contained within the amorphous matrix. While the elements contained within the amorphous portion of the mineral are dissolved or leached out of the mineral, elements contained within the crystalline portion of the mineral do not dissolve in the base or alkaline solution therefore leaving them in place either in a partial or full crystalline structure. In other words, the process of dissolution, separation and reaction of the hyaloclastite can be composed of first a reaction with a base or alkaline solution followed by a reaction with an acid. The base or alkaline solution can be added or combined with the hyaloclastite, or it can be the product of the hyaloclastite reaction with the water, energized, electrolyzed oxidized (EC) or ionized water at elevated temperature.

Any one of the dissolution and reaction processes described in the present invention can be conducted at ambient or elevated temperature such as between 50° C. and 500° C., preferably between 50° C. and 400° C., preferably between 50° C. and 300° C., more preferably between 60° C. and 200° C., most preferably between 70° C. and 150° C., most preferably between 70° C. and 100° C. Any of the dissolution and reaction processes described in the present invention can be conducted at atmospheric, sub-atmospheric or at elevated pressure. Any of the dissolution and reaction processes described in the present invention can be aided by microwave radiation or ultrasound treatment.

In particular the use of partially amorphous and partially crystalline hyaloclastite is found to be desirable. As the hyaloclastite is placed in any type of solution described in the present invention, the elements contained within the amorphous matrix portion of the hyaloclastite dissolve much faster and easier thereby dissolving first compared to the elements contained in the crystalline matrix portion. The leaching or dissolution of these elements contained in the amorphous matrix portion, done in either a first or second reactor or a combination of the two or a combined process in one reactor, leave behind the crystal lattices or structures of crystalline portion of the hyaloclastite matrix. These lattices and structures especially between the Si and Al and optionally Ti in conjunction with O give a start to the formation of a zeolite. In other words, the alkaline metals are first to be removed from the amorphous matrix, then Si, Al, Fe and any and all other, elements, metals and rare earth elements are removed from the balance of the solution. Once the alkali metals or hydroxides, or sufficient amounts thereof, have been removed, the solution containing the Si, Al and all other elements is further separated. The Si, Al, optionally Ti and any other suitable elements to create a zeolite are separated from the less easily leachable elements or metals such as the Fe, the rare earth elements and other elements contained in minor amounts as listed above. The manufacturing process and raw materials needed to create synthetic zeolites are well known in the art.

Zeolites with three-dimensional structures occur naturally or can be synthesized. An object of the present invention is to separate and use the silica and alumina portion of the hyaloclastite from the first or second phase or any other phase or method or dissolving and separating the various elements contained therein of the process described in accordance with the present invention. Zeolites, a member of the microporous crystalline aluminosilicate family, is also known as "molecular sieves". A zeolite has the three-dimensional structure which is composed of the networks of $[SiO_4]^{4-}$ and $[AlO_4]^{5-}$ tetrahedral linked to each other with oxygen atoms. Depending on the structural type, cages are formed by connecting the pore openings of defined sizes (i.e., 0.3-1.0 nm) in the tetrahedral structures. In addition to Si and Al, zeolites may contain any number of other elements such as alkali metals and Ti. Presently, there are over two hundred types of zeolites known however the possible number of zeolite composition is an order of magnetite greater than what has been made so far in a laboratory. These are based on the silica-alumina ratio. It has been found that natural zeolites have better resistivity and thermal stability in different environments. Their thermal stability and chemical resistance increase with the increase of the silica-alumina ratio as well as in the presence of alkali cations in the zeolite framework. Zeolites are usually divided into two main categories: natural zeolites (e.g., clinoptilolite, mordenite and garronite), and the synthetic zeolite (e.g., zeolite A, P, X and Y). The object of the present invention is to create a synthetic zeolite of any type, such a re-creating a natural type of zeolite, any type of the known synthetic zeolites or create a new type of zeolite knows or unknown to the zeolite nomenclature. The size of zeolite pores can be designed to the optimal size to absorb and separate $CO_2$ from a gas flue in the presence of other gases such as NOx. Synthetic zeolite type A, zeolite P, zeolite X and zeolite Y differ mainly due to the content of aluminum (as alumina) can influence the crystal structure and the ion-exchange selectivity of the zeolite molecule. Generally, the ion-exchange capacity as well as rate of dissolution increase with the increase of alumina content as well as sodium content. Additionally, zeolites can be hydrolyzed at any acidic pH, although preferably at a low pH (below 4.0), therefore, their crystal structure can be destroy by releasing the sodium ion, silicic acid, and aluminum salt. However, the aqueous suspension of zeolite is found to be in the alkaline region (i.e., at a pH of 10-10.5). Zeolite A consists of sodalite cages which are connected with double 4-ring cuboidal-shaped crystals. Zeolite type P is unique in characteristics which belonging to the gismondine family. Zeolite types X and Y belong to the family of faujasite-type structure (FA U). In contrast to zeolite type X, Y has a higher Si/Al ratio>1-1.5. However, these zeolites are more spherical. They have cuboctahedron building blocks which are linked to a faujasite structure via hexagonal prisms. They have a larger pore diameter (~0.74 nm) and high surface area. Hence, they are capable of exchanging more ions like calcium and magnesium.

Manufacturing zeolites in accordance with the present invention is by hydrothermal method. There are many factors which can affect the performance of any hydrothermal method for example temperature and pressure, batch composition, silica and aluminum ratio, reactant materials, overall alkalinity, aging time, template condition, and seeding. To date, there have been multiple methods to synthesis zeolites via conventional hydrothermal method. Time, temperature and pressure are all a factor in the synthesis of the zeolite. Conventional autoclaves can be used to synthetize zeolites as well as any other type of suitable reactors known in the art. To overcome potential limitation of conventional hydrothermal processes for zeolite synthesis, researcher have developed diverse means of sustainable ways for synthesizing strategies such as microwave-assisted hydrothermal method, alkali fused hydrothermal method, microwave digested-alkali fusion assisted hydrothermal method, and ultrasound-assisted hydrothermal method. Microwave-assisted synthesis has characteristic "microwave effects" highlighted the zeolite synthesis through is microwave heating which offered lower time requirement for the zeolite production over the conventional hydrothermal method. Utilization of microwave heating throughout the synthesis can be efficient to reduce synthesis reaction period. Another method is the sonochemical-assisted hydrothermal for the synthesis of zeolites. For example, reported sonochemical-assisted hydrothermal growth of zeolite T.

A further method is to create a so called "sol-gel". This is a physicochemical process that involves the formation of an inorganic colloidal suspension (sol), and the gelation of the sol in a continuous liquid phase (gel) to form a three-dimensional network structure containing the suspended silica and alumina in colloidal or nano-form along with optional minor elements found in the hyaloclastite composition. The silica, alumina, and all other elements contained in the hyaloclastite solution and separated from the carbonatable elements or hydrides, can be in the form of a salt, an oxide, a nano size precipitate or a colloid. The sol-gel process encompasses the transition of a solution system from a liquid "sol" into a solid "gel" phase. This method provides better control of the technique which ultimately provides higher porosity and definite particle size. There are several factors which can influence the performance of this method. They are: (i) hydrolysis rate, (ii) temperature, (iii) heating rate and (iv) pH.

Microwave heating is a fast and energy-efficient technique where microwave radiation is applied for the synthesis of zeolites. In this method, microwaves act as high-frequency electric fields which eventually produce heat to carry out the reaction. Hence, the energy transfer from the microwave to the reactant material occurs either through resonance or relaxation. There are many advantages of using microwave methods. For example, concise time, which leads to small particle size and high purity zeolite can be obtained. Factors that affect the microwave method are (i) $SiO_2/Al_2O_3$ molar ratio (Si/Al), (ii) alkalinity, (iii) wavelength produced from the magnetron, (iv) zeolization time and temperature, (v) crystallization time and temperature. In most of the cases, microwave-assisted synthesis of zeolite is applied in combination with other methods such as hydrothermal, solvothermal and ionothermal.

Ultrasound with frequency 20 kHz to 2 MHz is a branch of termed sonochemistry which is widely used in synthetic chemistry. Ultrasound has significant influences in different types of synthesis cases such as various amorphous or crystalline materials synthesis and polymerization reactions. Because of high influences on crystallization, application of ultrasound is has received much more attention in the field of zeolite synthesis. The advantages of this method are very simple, rapid reaction, and do not need any complex facilities, high crystal growth rate, suitable particle size distribution and morphology and provide control of the nucleation process. Ultra-sound develops cavitation, and this cavitation is the result of the growth and explosive collapse of microscopic bubbles. The cavitation can also raise the secondary nucleation rates and the crystal purity in the time of cooling crystallization. Ultrasound energy method offers zeolite synthesis with tunable properties. Temperature, time, and the molar ratio of reactants are considered as the main parameters to determine the type and characteristics of the zeolite formed. Ultra-sound energy methods have been used extensively to synthesis zeolites.

While an object of the present invention is to create a zeolite with properties suitable for absorption of $CO_2$, any other type of zeolite suitable for any other type of application can be created from the dissolution of the hyaloclastite in accordance with the present invention as described above. Zeolites have tunable channels with a very rigid framework. This imparts zeolites with excellent shape selectivity and capabilities with respect to gas molecules. Natural and synthetic zeolites are capable of removing SOx, NOx, COx, $H_2S$, and storing $H_2$ gas in addition to the adsorptive removal of $CO_2$. Zeolites and metal-organic frameworks are one of the most widely applicable classes of solid-porous adsorbents for CO₂ capture. However, narrow pore openings limit $CO_2$ capture dynamics. Hierarchically, porous zeolites have attracted great interest since they have exhibit additional porosity on the larger length scales (mesopores and/or macropores) resulting in shorter pathways to the zeolitic microspores. This can be significantly improved the $CO_2$ diffusion and consequently faster adsorbtion kinetics. To enhance $CO_2$ separation selectivity and adsorption capacity for carbon capture and sequestration applications, recently a core-shell Zn/Co zeolitic imidazolate framework (ZIF) was synthesized which showed the maximum $CO_2$ uptake (3.22 mmol/g at 273 K and 1 bar). This was 2.13 times higher than that of the raw core-shell Zn/Co ZIF. Currently, nitrogen-doped carbons derived from core-shell Zn/Co ZIF have proved to be promising materials for solid $CO_2$ separation from industrial power plant flue gas. Zeolites created in accordance with the present invention can be designed to remove and/or store radioactive materials, various contaminants, various heavy metals, pollutants, toxic elements or substances, organic or inorganic removal, extraction, separation, or storage and the like.

Metal-organic frameworks (MOFs) are organic-inorganic hybrid crystalline porous materials that consist of a regular array of positively charged metal ions surrounded by organic is "linker" molecules. The metal ions form nodes that bind the arms of the linkers together to form a repeating, cage-like structure. Due to this hollow structure, MOFs have an extraordinarily large internal surface area and can adsorb or embed significant amounts of carbon dioxide in its pore structure. Currently more than 90,000 different MOF structures have been reported and over 500,000 are predicted to be possible. Metal Organic Frameworks (MOFs) constitute a class of solid porous materials, which consist of metal ions or metallic clusters, which act as nodes, and polydentate organic ligands, which act as linkers between the nodes. The metal nodes (metal ions or metallic clusters) act as connection points and the organic ligands bridge the metal centers through coordination bonds, thus, forming networks of one-dimension, two-dimensions, or three-dimensions. The main structural features of the MOFs, which are directly related to their properties and applications, are the high porosity, the large volume of the pores, which can reach the 90% of the crystalline volume or more, the large specific surface area (several thousand $m^2 \cdot g^{-1}$), and the high thermal stability (250-500° C.) due to the presence of strong bonds (e.g., C—C, C—H, C—O, and M-O). Examples of MOFs are Isoreticular Metal Organic Frameworks (IRMOFs), such as IRMOF-3 containing 2-amino-1,4-benzenedicarboxylic acid can undergo chemical modification with a diverse series of anhydrides and isocyanates yielding isostructural MOFs containing different functional groups, MOF-74-Mg, which is the magnesium analogue of MOF-74, shows the highest $CO_2$ uptake capacity of 228 and 180 $cm^3 \cdot g^{-1}$ at 273 and 298 K and 1 bar, respectively, MOF-74-Mg, MOF-210 has a very high surface area of 10,450 $m^2 \cdot g^{-1}$ and shows a $CO_2$ uptake value of 2400 $mg \cdot g^{-1}$ (74.2 wt %, 50 bar at 298 K), MOF-177 or MIL-101(C r) (60 wt % and 56.9 wt %, respectively), MOF-200, MOF-210 under similar conditions. Other MOFs, which show considerably higher $CO_2$ uptake compared with other solid materials, are the NU-100 (69.8 wt %, 40 bar at 298 K), the MOF-5 (58 wt %, 10 bar at 273 K), HKUST-1 (19.8 wt %, 1 bar at 298 K), MIL-100(Fe), a Porous Iron Trimesate with a Hierarchical Pore Structure, cyclodextrin based MOFs, IRMOF-74-III-CH₂NH₂, IRMOF-74-III-CH₂NHMe, carbamic types and the likes. Alternatively, one or more of the iron, copper, zinc and any other suitable element to create MOFs dissolved or separated from the calcium-iron aluminosilicate mineral powder can be separated and combined with organic compounds suitable to create MOFs as described in the current invention. Organic compounds used in the manufacture of MOFs are known in the art and any one or more can be combined with any one or more of the metals contained within the matrix of the calcium-iron aluminosilicate.

Metal-organic frameworks (MCFs) are made by connecting metal centers with organic linkers through coordination bonds. The process of creating MOFs plays a crucial role in crystal structure formation. This determines their properties and how well they perform in various applications. The base process of MOFs manufacture is based on the type of reagents used, the methods used and the parameters of the process. Examples of reagents are MOF ligands, metal center, modulators and solvent among others. The parameter to take into consideration are the concentration of the solution, the ratios of reagents, temperature, time and pH of the solution. Among the methods of manufacture are Solvothermal/Hydrothermal, Microwave-assisted, Electrochemical, Mechanochemical, Sonochemical, Various other techniques like the diffusion method, spray-drying synthesis, ionothermal synthesis, and chemical vapor deposition have also been used in the creation of MOFs. The diverse range of methods and reagents available has enabled the synthesis of 90,000+ different MCFs. Controlling the structure, size and functionality of MOFs has meant these materials are suitable for a huge range in applications. Once a synthetic method has been selected and MOF crystals are formed, the material is washed to remove unreacted reagents. This is done with the solvents used in the initial reaction as well as other more volatile solvents. Centrifugation is often used to collect MCF crystals and the washing supernatant is disposed of. Fresh solvent is used to re-suspend MCF crystals and the process is repeated. The MOF is then activated by removing the guest solvent from the MOF pores in order to access the full surface area of the MOF. Accessing the full porosity is crucial in ensuring full performance especially for storage and separation applications. Any one or more of the methods, reagents and parameters known in the art can be used to manufacture MOFs suitable for the absorption of $CO_2$ or for any other suitable application or purpose in accordance with the present invention.

The $CO_2$ absorbent materials manufactured from a portion of the leached, dissolved and separated elements or compounds contained within the hyaloclastite can be used to remove or capture $CO_2$ from flue gas produced from any type of combustion process such as coal, natural gas, petcoke, or any other type of hydrocarbon or fuel type. Such application can remove $CO_2$ from thermoelectrical generation, cement, lime and steel manufacturing plants. The microporous materials embedded or containing $CO_2$, such as zeolites or MOFs, can be used as described in the present invention or as described U.S. Pat. Nos. 11,884,602; 11,986, 769; 12,291,491; and 12,145,882 and U.S. patent application Ser. No. 18/664,661 filed M ay 15, 2024 and Ser. No. 18/421,638 filed Jan. 24, 2024, the disclosures of which are all incorporated herein by reference in their entirety.

Chemical reaction devices involving acid and/or base, and related systems and methods, are generally described. In some embodiments, a method comprises producing base near a first electrode (e.g., cathode) and acid near a second electrode (e.g., anode) that is electrochemically coupled to the first electrode. In certain embodiments, the method comprises collecting the acid and/or base. In some instances, the method comprises storing the acid and/or base. In some embodiments, the method comprises reacting the acid and/or base in a chemical dissolution (e.g., reacting the acid or base with the hyaloclastite or calcium-iron-aluminosilicate, to produce metal ions, such as calcium ions, magnesium ions, sodium ions, potassium ions and/or carbonate ions). In certain embodiments, the method comprises reacting the acid and/or base in a precipitation reaction (e.g., reacting the base with metal ions, such as calcium ions, to produce a metal hydroxide, such as $Ca(OH)_2$, $Mg(OH)_2$, NaOH and/or $K(OH)_2$ and the like. In some embodiments, the metal hydroxide can be used in lime or cement-making processes and in other cases it can be combined with $CO_2$ to create simple or complex carbonates thereby mineralizing carbon dioxide.

In some cases, production of the acid near the second electrode and/or production of the base near the first electrode results in production of a gas (e.g., $CO_2$, $H_2$, and/or $O_2$). In certain cases, one or more of the gases can be collected, sold, used in a downstream process, and/or fed back into the system. In some instances, production of the acid near the second electrode and/or production of the base near the first electrode produces a reduced amount of gas, does not produce a gas and/or does not produce a net amount of gas, as any produced gas is used by the system (e.g., to increase the pH gradient between the electrodes). In certain embodiments, the acid produced near the second electrode and/or the base produced near the first electrode, for example, during periods of low electricity cost, can be used to produce hydrogen gas and/or oxygen gas, for example, in periods of high electricity cost.

In other cases, $CO_2$ can be introduced into the electrochemical reactor and further combined with one or more of the metal hydroxides or un-carbonated elements found in the hyaloclastite or calcium-iron-aluminosilicate to create simple or complex carbonate compounds or minerals. In certain embodiments, the electrochemical reactor is configured to receive one or more of a calcium-iron-aluminosilicates. In some embodiments, the electrochemical reactor comprises a first outlet configured to discharge $Ca(OH)_2$, $Mg(OH)_2$, NaOH, KOH and/or lime (CaO). In certain cases, the electrochemical reactor comprises a second outlet configured to discharge or to receive $CO_2$, $O_2$, and/or $H_2$ gas. In accordance with certain embodiments, a kiln is configured as part of the flow process to heat the $Ca(OH)_2$ and/or lime (and/or a reaction product thereof) as part of a lime or cement manufacturing process. In accordance with another embodiments, a separate reactor is configured as part of the flow process to combine one or more of the metal hydroxides, removed from the first reactor, such as $Ca(OH)_2$ $Mg(OH)_2$, NaOH and/or KOH, with $CO_2$ to create one or more simple or complex carbonates, such as $CaCO_3$, thereby mineralizing $CO_2$. In accordance with another embodiment, a separate reactor is configured as part of the flow process to combine alumina, silica and optionally titanium or any other element, removed from the first reactor, with any other suitable compound or element to create a zeolite. In accordance with yet another embodiment, a separate reactor is configured as part of the flow process to combine a metal or any other suitable element, removed from the first reactor, with any other suitable element or compound to create a metal-organic framework.

Preferably, but not necessarily, in any of the methods disclosed herein, the optional Step or Phase 1 comprises combining the hyaloclastite with hot water or steam at elevated temperature so that the certain elements contained in the hyaloclastite solution dissolve such as by reaction or dissolution such that the dissolved calcium, sodium, potassium and potentially magnesium may combine with OH- to create hydroxides and solid silica, alumina and other elements contained in the balance of the hyaloclastite composition. It is noted that the greater the amorphous content of the calcium-iron-aluminosilicate mineral, the more efficient the first dissolution step by water or steam at elevated temperature is to leach out the desirable elements via the hydroxyl groups or other type of element dissolution from the hyaloclastite composition formation. In other words, it may be desirable to first selectively dissolve out only the desired elements that are easiest to dissolve in a hydrothermal system to create the hydroxides based on the ratio of amorphous vs. crystalline make-up of the of the calcium-iron-aluminosilicate mineral. The un-hydrolyzed or undissolved portion of the mineral, if any, ideally containing the alumina, silica, iron oxide and any other element contained in the hyaloclastite chemical compositions can then be separated and used for whatever purpose may be suitable. A potential use is a pozzolan especially if in an amorphous matrix. Another potential use is the creation or manufacture of a zeolite with properties suitable to absorb carbon dioxide from a gas flue or from any other source of carbon dioxide such as a carbon capture process. A further use of the balance of the elements contained in the remaining undissolved hyaloclastite composition after separating the first dissolved elements are to further separate each and every element contained therein to be used in whatever suitable applications. Optionally, the un-hydrolyzed or undissolved portion of the mineral, ideally containing the alumina, silica and iron oxide can be separated from the first salt and used in Step 3 below to combine with calcium sulfate to manufacture lime, dolomitic lime or hydraulic cement containing calcium oxide, alite and/or belite.

Preferably, but not necessarily, in any of the methods disclosed herein, the first reacting step/phase comprises hydrolyzing the hyaloclastite solution such as by reaction or electrolysis and reacting the calcium-iron-aluminosilicate mineral with a first acid, such as hydrochloric acid, to form at least one first salt, such as a chloride salt, such as aqueous calcium chloride, aqueous magnesium chloride or chlorite, aqueous aluminum chloride, and solid silica. Preferably, but not necessarily, in any of the methods disclosed herein, the first separating step comprises separating a first aqueous fraction comprising the first aqueous salt, such as calcium chloride, aqueous magnesium chloride or chlorite and/or the aqueous aluminum chloride, from a first solid fraction comprising the solid silica. It is noted that the greater the amorphous content of the calcium-iron-aluminosilicate mineral the more efficient the first acid dissolution step to leach out the desirable elements via the first chloride salt formation. However, a desirable ratio of amorphous and crystalline mineral w ill make it such that a portion of the mineral w ill dissolve and another portion of the mineral will not dissolve in the first acid. Optionally, the first reacting step/phase comprises hydrolyzing the hyaloclastite solution such as by reaction or electrolysis and reacting the calcium-iron-aluminosilicate mineral with a first base, to form at least one first hydroxide or halide such as calcium hydroxide, sodium hydroxide, and the like, remove or separate the hydroxide groups from the alumina, iron oxide, solid silica and the balance of the elements contained in the solution. Alternatively, the first reacting step can be a combination of first combining hyaloclastite with a base and then combining the balance of the solution with an acid. Alternatively, the calcium oxide from the matrix of the calcium-iron-aluminosilicate mineral can hydrolyze the hyaloclastite solution such as by electrolysis and converting it into a solution to dissolve first either from the amorphous or the crystalline portion of the calcium-iron-aluminosilicate mineral leaving the rest of the elemental composition in a state close to the initial crystalline or amorphous state minus the leached elements. In other words, it may be desirable to selectively leach out only the desired element to create the first salt based on the ratio of amorphous vs. crystalline make-up of the calcium-iron-aluminosilicate mineral. The un-hydrolyzed or undissolved portion of the mineral, if any, ideally containing the alumina, silica and iron oxide can then be separated and used as a pozzolan especially if in an amorphous matrix. Optionally, the un-hydrolyzed or undissolved portion of the mineral, ideally containing the alumina, silica and iron oxide can be separated from the first salt and used in Step 3 below to combine with calcium sulfate to manufacture lime, dolomitic lime or hydraulic cement containing calcium oxide, alite and/or belite.

Preferably, but not necessarily, in any of the methods disclosed herein, the second reacting step/phase comprises hydrolyzing the hyaloclastite solution by electrolysis and converting it into solution containing one or more alkaline metal oxides or hydroxides such as calcium oxide or hydroxide, magnesium oxide or hydroxide, and the like and precipitated silica, iron, titanium and/or alumina, and the balance of the elements contained in the hyaloclastite. Alternatively, the second reacting Step or Phase 2 of the process skips the first step above where the calcium-iron-aluminosilicate is hydrolyzed by electrolysis and converting it into solution containing one or more alkaline metal oxides or hydroxides such as calcium oxide or hydroxide, magnesium oxide or hydroxide, and the like and precipitated silica and or alumina, and the balance of the elements contained in the hyaloclastite. Alternatively, the calcium oxide from the matrix of the calcium-iron-aluminosilicate mineral can dissolve first either from the amorphous or the crystalline portion of the calcium-iron-aluminosilicate mineral leaving the rest of the elemental composition in a state close to the initial crystalline or amorphous state minus the leached elements. In other words, it may be desirable to selectively leach out only the desired element to create the one or more metal oxides or metal hydroxides based on the ratio of amorphous vs. crystalline make-up of the calcium-iron-aluminosilicate mineral. In part the dissolution process can be initiated in a wet mill process for reducing the hyaloclastite in size to the desired particle size to facilitate the dissolution described in the present invention. The undissolved portion of the mineral, ideally containing the alumina, silica and iron oxide can then be separated and used as a pozzolan especially if in an amorphous matrix. Optionally, the undissolved portion of the mineral, ideally containing the alumina, silica and iron oxide can be separated from the halides and used in Step 3 below to combine with the calcium oxide or hydroxide to manufacture lime, dolomitic lime or hydraulic cement containing calcium oxide, alite and/or belite. Additionally, all other elements contained in the balance of the solution can be separated in groups or in individual steps to be used in any suitable application, process or part of another manufacturing process.

Preferably, but not necessarily, in the optional Step 1, or in either Steps 1 or 2, carbon dioxide can be combined with any one or more of the hydroxides groups, such as $Ca(O)_2$, NaOH, KOH, $Mg(OH)_2 \cdot Al(OH)_3$, $Fe(OH)_2$, to create simple carbonates such as calcium (Calcite) $CaCO_3$, sodium carbonate, sodium bicarbonate, potassium carbonate and magnesium (Magnesite) $MgCO_3$, Aluminum carbonate $Al_2(CO_3)_3$, Siderite $FeCO_3$ (Iron carbonate using Fe(II) found in hyaloclastite) carbonates, or more complex carbonates thereby mineralizing carbon dioxide. Examples of simple carbonates are of the followings: Anhydrous carbonates Gaspéite $(Ni,Mg,Fe^{2+})CO_3$, Otavite $CdCO_3$, Rhodochrosite $MnCO_3$, Smithsonite $ZnCO_3$, Spherocobaltite $CoCO_3$, Aragonite $CaCO_3$, Cerussite $PbCO_3$, Strontianite $SrCO_3$, Witherite $BaCO_3$, Rutherfordine $UO_2CO_3$, Natrite $Na_2CO_3$. Examples of complex carbonates are not limited to the following carbonates with hydroxide groups such as Azurite $Cu_3(CO_3)_2(OH)_2$, Hydrocerussite $Pb_3(CO_3)_2(OH)_2$, Malachite $Cu_2CO_3(OH)_2$, Rosasite$(Cu,Zn)_2CO_3(OH)_2$, Phosgenite $Pb_2(CO_3)Cl_2$, Hydrozincite $Zn_5(CO_3)_2(OH)_6$, Aurichalcite $(Zn,Cu)_5(CO_3)_2(OH)_6$; anhydrous carbonates such as Ankerite $CaFe(CO_3)_2$, Dolomite $CaMg(CO_3)_2$, Huntite $Mg_3Ca(CO_3)_4$, Minrecordite $CaZn(CO_3)_2$, Barytocalcite $BaCa(CO_3)_2$ and hydrated carbonates such as Hydromagnesite $Mg_5(Co_3)_4(OH)_2 \cdot 4H_2O$, Ikaite $CaCO_3 \cdot 6(H_2O)$, Lansfordite $MgCO_3 \cdot 5(H_2O)$, Monohydrocalcite $CaCO_3 \cdot H_2O$, Natron $Na_2CO_3 \cdot 10(H_2O)$, Zellerite $Ca(UO_2)(CO_3)_2 \cdot 5(H_2O)$ among others. Other examples of complex carbonates include siderite-ankerite compositions of Ca—Fe—Mg—Mn carbonates composed of manganoan ankerite $[Ca(Mn,Fe)(CO_3)_2]$ and ankerite $CaFe(CO_3)_2$ mixtures of siderite, ankerite, and kutnohorite $(CaMn(CO_3)_2)$.

Preferably but not necessarily, under certain conditions hyaloclastite can dissolve into a combination of hydroxides and oxides or more particularly into metal oxides. In such conditions carbon dioxide can also reactor combine with one or more metal oxides to create simple or complex carbonates. When $CO_2$ reacts with metal oxides (indicated here as MO, where M is a divalent metal, e.g., calcium, magnesium, or iron) the corresponding carbonate is formed and heat is released according to the following chemical reaction:

$$MO + CO_2 \rightarrow MCO_3 + heat$$

Given the complexity of the hyaloclastite elemental composition the possibilities of solution types to combine the reduced in size hyaloclastite with and the variety of possible elemental dissolution in one or more steps, the resulting carbon dioxide reaction with any one or is more of these resulting compounds can result in types of known or unknown carbonates. It is also possible that the resulting carbonate range and types may be greater than the list above and it may be possible that new unknown complex carbonates may be created from the carbon dioxide mineralization process in accordance with the present invention.

Preferably, but not necessarily, in any of the methods disclosed herein, the third step/phase is a thermally treating process, comprising heating the second salt or metal hydroxide, metal halide or sulfate, such as calcium sulfate or sulfite or calcium hydroxide or a combination thereof, to form calcium oxide. The desorption of $SO_2$ or OH is a highly endothermic reaction requiring temperatures of above 1100° C. (Step 3 (a)). Optionally, to reduce the temperature of Step 3 above an optional Step 3 (b) the calcium sulfate, sulfite, hydroxide, halide and the like or a combination thereof is first mixed with a sufficient amount of alumina, silica and iron oxide in proportions required to make a hydraulic cement containing calcium oxide, and/or alite and/or belite. The source of the alumina, silica and iron oxide can be the undissolved co-product of Step 1 as described above or the initial calcium-iron-aluminosilicate mineral in appropriate ratios. The heating process of Step 3 to obtain calcium oxide from calcium hydroxide, sulfate, sulfite decreases to about 900° C. optionally in the presence of the silica, alumina and iron oxide. The heating process of Step 3 can be performed in a conventional kiln, a fluid bed, such as a circulating fluid bed, or a vibratory plate microwave oven. However, a circulating fluid bed is preferable. The fuel used in a kiln or fluid bed can be a hydrocarbon fuel such as coal, natural gas (methane) or coke or it can be an oxifuel produced by an electrochemical reactor or a combination thereof. In the case of the fuel being a hydrocarbon, the calcium sulfate can be reduced with carbon to partially create calcium sulfite in a ratio of 1:3.

Reactors comprising spatially varying chemical composition gradients (e.g., spatially varying pH gradients), and associated systems and methods, are also described. In some embodiments, electrochemical reactors comprise spatially varying chemical composition gradients (e.g., spatially varying pH gradients). In certain embodiments, precipitates are formed using a spatially varying chemical composition gradient (e.g., spatially varying pH gradient). In some embodiments, a chemical compound (e.g., such as a calcium-iron-aluminosilicate) is dissolved in a first region (e.g., an acidic region) of the spatially varying chemical composition gradient (e.g., the spatially varying pH gradient) and a precipitate comprising one or more elements (e.g., metal) from the chemical compound (e.g., the metal salt or metal oxide) is formed in a second region (e.g., an alkaline region) of the spatially varying chemical composition gradient (e.g., the spatially varying pH gradient).

Some embodiments concern compositions, methods, and reactor designs in which an electrolytic reaction is used to produce a chemical composition gradient between the positive and negative electrodes of an electrochemical cell. Said electrolytically produced composition gradient is then employed, in some embodiments, to conduct a desired chemical reaction by feeding a reactant to the chemical environment near one electrode and using the electrolytically produced chemical gradient to produce a product from said reactant as the reactant or its components diffuse toward the other electrode. In some embodiments, a desired chemical reaction is conducted by collecting solutions or suspensions of differing composition produced electrolytically, and using said solutions or suspensions to produce a product from said reactant in a portion of the reactor or in a separate apparatus. In one embodiment, such a reactor is directed to the production of a decomposed, mineral or metal salt through electrochemical and chemical means. In another embodiment, such a reactor is used for the production of a decomposed mineral or metal hydroxide through electrochemical and/or chemical means. In one embodiment, the use of fossil fuels for production of thermal energy, and the associated production of greenhouse gases or gases that are atmospheric pollutants, is reduced or avoided through the use of such a reactor in place of traditional thermal calcination that involves heating of the mineral or metal salt to decompose it. In some embodiments, the mineral or metal salt comprises a metal carbonate, and the greenhouse gases produced are at least in part carbon dioxide.

Some embodiments are related to a process for the production of cement, such as portland cement. Traditional methods for industrial production of cement include the calcination of $CaCO_3$ by thermal means. In current manufacturing of cement, about 60% of the $CO_2$ emissions result from the calcination of $CaCO_3$, and about 40% of the $CO_2$ emissions result from the burning of fossil fuels to carry out the calcination and sintering processes. Thus, there exists a great need for cement production processes that emit less $CO_2$. Some embodiments are related to a cement production process in which thermal calcination is replaced by herein described electrochemical processes that produce less $CO_2$ per quantity of cement produced than current manufacturing.

Cement production systems comprising electrochemical reactors, and related methods, are also described. Certain embodiments are related to inventive systems for producing cement comprising an electrochemical reactor and a kiln. In certain embodiments, the electrochemical reactor is configured to receive one or more hyaloclastite, calcium-iron-aluminosilicate and optionally $CaCO_3$. In some embodiments, the electrochemical reactor comprises a first outlet configured to discharge $Ca(OH)_2$ and/or lime (CaO). In certain cases, the electrochemical reactor comprises a second outlet configured to discharge or receive $CO_2$, $O_2$, and/or $H_2$ gas. In accordance with certain embodiments, the kiln is configured to heat the $Ca(OH)_2$ and/or lime (and/or a reaction product thereof) as part of a cement-making process.

Certain embodiments are related to inventive methods in which $Ca(OH)_2$ and/or lime (CaO) is produced in an electrochemical reactor. In some embodiments, the $Ca(OH)_2$ and/or lime from the electrochemical reactor is then transported to a kiln, which heats the $Ca(OH)_2$ and/or lime (and/or a reaction product thereof) as part of a cement making process. In some embodiments, the electrochemical reactor also produces or receives $CO_2$, $O_2$, and/or $H_2$ gas. According to certain embodiments, the $CO_2$ is sequestered, mineralized, used in liquid fuel, used in oxyfuel, used in enhanced oil recovery and any other type uses. In certain instances, the $H_2$ can be sequestered and/or used as a fuel (e.g., in a fuel cell and/or to heat the system). In some embodiments, at least a portion (e.g., at least 10%, at least 25%, at least 50%, at least 75%, at least 90%, or all) of the $CO_2$, $O_2$, and/or $H_2$ discharged from the system is fed into the kiln.

In one disclosed embodiment, the present invention involves a hydraulic cement manufacturing process using a natural calcium-iron-aluminosilicate mineral within the chemical composition preferably comprises approximately 30 to approximately 57 percent by weight $SiO_2$, approximately 10 to approximately 18 percent by weight $Al_2O_3$, approximately 5 to approximately 18 percent by weight $Fe_2O_3$, and approximately 4 to approximately 25 percent by weight CaO and preferably wherein the sum of the $Al_2O_3$+$Fe_2O_3$ is between approximately 20 to approximately 35 percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3$+$Fe_2O_3$ is preferably between approximately 1.25 and 2.25, ideally approximately 1.5, to produce lime or hydrated lime.

In another disclosed embodiment the lime produced through the manufacturing process described above is further combined with iron, alumina and silica either resulting from the same manufacturing process as the lime or from separate minerals or from the same calcium-iron-aluminosilicate mineral used to produce lime and calcining the combined lime, iron, alumina and silica at a temperature sufficiently high to sinter these elements together to produce a hydraulic cement clinker.

In some embodiments, the acid and/or base described herein is reacted in a chemical dissolution and/or precipitation reaction. In certain cases, the acid and/or base is reacted in a chemical dissolution. In some embodiments, the chemical dissolution comprises the dissolution of a solid calcium-iron-aluminosilicate to form two or more solubilized ions. In some embodiments, the solid comprises a metal, metal alloy, metalloid, metal salt, a metal oxide, a metal hydroxide, and/or a silicate. In certain embodiments, the solid is crystalline, amorphous, nano particle, colloidal, nanocrystalline, and/or a mixture thereof. In some embodiments, the solid comprises Ag, A, As, Au, Ba, Ca, Cd, Cl, Co, Cr, Cu, Fe, Hg, K, Mg, Mn, Mo, Na, Ni, P, Pb, S, Sb, Se, Si, Sn, Ti, Tl, V, Wand/or Zn (e.g., in elemental form, as an oxide or as a salt).

In some instances, the acid and/or base is reacted in a precipitation reaction. In certain embodiments, the precipitation reaction comprises the combination of two solubilized ions to form a solid precipitate. In some embodiments, the solid precipitate comprises a metal hydroxide. Examples of suitable metal hydroxides include calcium hydroxide, magnesium hydroxide, sodium hydroxide, potassium hydroxide, barium hydroxide, strontium hydroxide, manganese hydroxide, iron hydroxide, cobalt hydroxide, zinc hydroxide, cadmium hydroxide, lead hydroxide, and/or nickel hydroxide. One or more of these hydroxide groups can be combined with $CO_2$ to create simple or complex carbonates thereby mineralizing carbon dioxide.

In other instances, the acid and/or base is reacted in a precipitation reaction. In certain embodiments, the precipitation reaction comprises the combination of two solubilized ions to form a solid precipitate. In some embodiments, the solid precipitate comprises a metal oxide. Examples of suitable metal oxides include calcium oxide, magnesium oxide, aluminum oxide, barium oxide, strontium oxide, manganese oxide, iron oxide (Fe(II) found in hyaloclastite), cobalt oxide, zinc oxide, cadmium oxide, lead oxide, and/or nickel oxide. One or more of these oxide groups can be combined with $CO_2$ to create simple or complex carbonates thereby mineralizing carbon dioxide. In accordance with some embodiments, the base is reacted in a precipitation reaction to form a metal hydroxide. In certain embodiments, the acid is reacted in a precipitation reaction to form one or more metal hydroxides.

In certain embodiments, the reactor is intermittently run when in the first mode (e.g., as described above). In some cases, the reactor is continuously run in the first mode. In certain is instances, the reactor is run intermittently in a first mode, while the reactions with the collected acid and or base (e.g., the chemical dissolution and/or precipitation reaction) are run continuously. For example, in some embodiments, the reactor produces enough acid and/or base when run in the first mode that it only needs to be run intermittently to produce enough acid and/or base to continuously perform the reactions (e.g., the chemical dissolution and/or precipitation reaction).

In certain cases, a byproduct of the precipitation reaction is fed back into the system (e.g., first reactor). In some instances, the system is configured to feed a byproduct from the precipitation reaction into the system (e.g., first reactor). In some embodiments, the byproduct has a neutral pH. For example, in certain cases, the byproduct has a pH of greater than 6, greater than or equal to 6.25, greater than or equal to 6.5, greater than or equal to 6.75, or greater than or equal to 6.9. In some instances, the byproduct has a pH of less than 8, less than or equal to 7.75, less than or equal to 7.5, less than or equal to 7.25, or less than or equal to 7.1. Combinations of these ranges are also possible (e.g., greater than 6 and less than 8 or greater than or equal to 6.9 and less than or equal to 7.1). In some embodiments, the byproduct has a pH of 7, in other embodiments the byproduct has a pH of 7.5 or greater and less than 10. In other embodiments the byproduct has a pH of less than 6, less than or equal to 5.75, less than or equal to 5.5, less than or equal to 5.25, or less than or equal to 5. In some instances, the byproduct has a pH of less than 4.5, less than or equal to 4.25, less than or equal to 4, less than or equal to 3.75, or less than or equal to 3.5, less than or equal to 3.25, less than or equal to 3, less than or equal to 2.75, or less than or equal to 2.5, less than or equal to 2.25, less than or equal to 2, less than or equal to 1.75, or less than or equal to 1.5. Combinations of these ranges are also possible (e.g., less than 6 and more than 4). In some embodiments, the byproduct has a pH less than 7 and greater than 4. The foregoing ranges include all of the intermediate values.

In some instances, the byproduct comprises an alkali halide (e.g., the byproduct in the precipitation of an alkali hydroxide) (e.g., NaCl). In certain cases, the byproduct comprises an alkali salt (e.g., $NaClO_4$, $NaNO_3$, sodium triflate, and/or sodium acetate).

In certain embodiments, different reactors may be operated in high-voltage and low-voltage modes. In another embodiment, a single reactor may be configured such that it can be operated in the high-voltage mode or in the low-voltage mode. In some embodiments, the reactor may be switched from the high-voltage mode to the low voltage mode by changing the pH of the liquid that flows to the electrode. For example, to switch to low-voltage mode from high-voltage mode an alkaline solution could be introduced to the second electrode, while an acidic solution could be introduced to the first electrode.

In some embodiments, the decision to switch between a high-voltage mode (e.g., producing $H_2/O_2$ while creating acid/base) and the low voltage mode (e.g., producing $H_2/O_2$ while neutralizing acid/base) may be based on the cost or availability of electricity, which may fluctuate throughout a day, month or year. In certain embodiments, when the cost of electricity is below a certain value, a reactor may be run in high-voltage mode (e.g., consuming more power while producing $H_2$, $O_2$, acid and base); when the cost of electricity is above a certain value, the reactor may be run in low voltage mode (e.g., consuming less power, while using the acidic and basic solutions to produce $H_2$ and $O_2$). In some embodiments, the system may effectively arbitrage the electricity cost of producing $H_2$: when electricity is inexpensive the system uses more of it by operating in high-voltage mode, in which some of the inexpensive electrical energy is converted into chemical energy that may be physically stored (e.g., in the form of acidic and basic solutions); when electricity is expensive the system may use less of it by operating in low-voltage mode, in which the stored chemical energy (e.g., the acidic and basic solutions) may be used to lower the energy requirement for producing $H_2$ and $O_2$. In some embodiments, the system may serve to decrease the electricity cost of producing $H_2$ and $O_2$. In some embodiments, the system may serve to produce hydrogen and oxygen at a constant rate using electricity that fluctuates in price or availability.

In accordance with some embodiments, the system may comprise a reactor comprising a region comprising a spatially varying chemical composition gradient (e.g., a spatially varying pH gradient). In some embodiments, the reactor may comprise a first electrode and a second electrode, one or more inlets supplying a liquid and/or a gas that undergoes electrolytic reaction or reactions, and a portion of the reactor or a separate apparatus in which the solutions are stored after undergoing electrolytic reactions. In some embodiments, the electrolytic reactions may produce a pH less than about six in the vicinity of the second electrode and a pH greater than about eight in the vicinity of the first electrode; the solutions of high and low pH may be collected and stored separately. In some embodiments, the electrodes may be configured to perform one or more of the electrolytic reactions to produce high or low pH solutions.

In certain embodiments, the electrolytic reactions may produce H2, O2, an acidic solution, and a basic solution. This is an example of an electrolytic mode, as it requires a higher is voltage than the fuel cell mode which will be described later. A non-limiting example of an electrolytic reaction occurring in the electrolytic mode is the oxidation of water at the second electrode (e.g., anode) ($2H_2O \rightarrow O_2 + 4H^+ + 4e^-$) and the reduction of water at the first electrode (e.g., cathode) ($2H_2O + 2e^- \rightarrow H_2 + 2OH^-$); this reaction requires a minimum voltage of 2 V when the pH at the second electrode is 0 and the pH at the first electrode is 14.

In certain embodiments, the acidic and basic solutions produced at the electrodes may be collected and stored separately. In certain embodiments, the reactions occurring in the fuel cell mode may be the oxidation of hydrogen at the second electrode (e.g., anode) ($H_2 \rightarrow 2H^+ + 2e^-$) and the reduction of oxygen at the first electrode (e.g., cathode) ($O_2 + 2H_2O + 4e^- \rightarrow 4OH^-$) (e.g., HRR/ORR reactions); this results in a spontaneous reaction that produces energy.

In accordance with certain embodiments, an electrolytically produced chemical composition gradient can be employed to conduct a desired chemical reaction by feeding a reactant to the chemical environment near one electrode, and using the electrolytically produced chemical composition gradient to produce a product from said reactant as the reactant or its components diffuse towards the other electrode.

In accordance with certain embodiments, the reactor comprises an inlet connected to a first region (e.g., an acidic region) of the spatially varying chemical composition gradient (e.g., spatially varying pH gradient). In certain embodiments, the electrochemical reactor and/or inlet is configured to receive a solid (e.g., one or more calcium-iron-aluminosilicate, hyaloclastite or $CaCO_3$). In some embodiments, the reactor comprises a reactor outlet. In some embodiments, the reactor outlet is configured to discharge $Ca(OH)_2$ (e.g., solid, paste or fluid calcium hydroxide) and/or lime (CaO). In some embodiments, the reactor comprises an outlet connected to a second region (e.g., an alkaline region) of the spatially varying chemical composition gradient (e.g., spatially varying pH gradient). In certain embodiments, the outlet is configured such that solids or paste can be expelled from the reactor. In some embodiments, the reactor comprises a solid or paste handling apparatus associated with the outlet and configured to remove solid or paste from the reactor. For example, in some embodiments, solids or paste handling apparatus is configured to remove solids or paste (such as solid or paste metal hydroxides, solid or paste calcium hydroxide, or solid or paste magnesium hydroxide, precipitated silica, precipitated alumina, precipitated iron oxide) from the reactor. Examples of solids or paste handling apparatuses include, but are not limited to, conveyor belts, augers, pumps, chutes, or any other device capable of transporting solids or paste away from the reactor. In some embodiments the solids or paste handling apparatus separates the solid or paste from the liquid using one or a combination of fluid flow, filtering, sedimentation, centrifugal force, electrophoresis, dielectrophoresis, or magnetic separation.

In some embodiments, the reactor comprises more than one reactor outlet (e.g., at least 1, at least 2, at least 3, at least 4, less than or equal to 5, less than or equal to 4, less than or equal to 3, or less than or equal to 2; combinations of these ranges are also possible). In certain embodiments, the reactor comprises a second outlet. In certain embodiments, the second outlet is configured to discharge or receive a gas (e.g., $CO_2$, $O_2$, and/or $H_2$). In some instances, the $CO_2$ is to be sequestered, used in a liquid fuel, used in an oxyfuel, used in enhanced oil recovery, and other useful applications. In some embodiments, the $O_2$ is to be sequestered, used as oxyfuel, used in a CCS application, and/or used in other useful applications. In certain cases, the $H_2$ is to be sequestered and/or used as a fuel (e.g., in a fuel cell and/or to heat the system). In some embodiments, at least a portion (e.g., at least 10%, at least 25%, at least 50%, at least 75%, at least 90%, or all) of the $CO_2$, $O_2$, and/or $H_2$ discharged from the system is fed into a kiln. In other instances, the $CO_2$ is fed into the reactor and combined with the hydroxide groups to create simple or complex carbonates thereby mineralizing carbon dioxide.

In some embodiments, the reactor comprises a third outlet and/or a fourth outlet. In some cases, the second outlet, third outlet, and/or fourth outlet is configured to discharge or receive $CO_2$, $O_2$, and/or $H_2$. For example, in some cases, the second outlet is configured to discharge $CO_2$ and $O_2$ while the third outlet is configured to discharge $H_2$. In certain instances, the second outlet is configured to discharge $CO_2$, the third outlet is configured to discharge $O_2$, and the fourth outlet is configured to discharge $H_2$.

According to some embodiments, the reactor further comprises one or more membranes selectively permeable to ions between the first electrode and the second electrode. In certain embodiments, the one or more membranes selectively permeable to ions comprises two membranes selectively permeable to ions. In certain embodiments, the two membranes selectively permeable to ions are different from each other.

In some embodiments, the one or more membranes selectively permeable to ions is configured to prevent solid from precipitating on the first electrode, prevent solid from passivating the first electrode, and/or prevent two different solids from contaminating each other. According to certain embodiments, a membrane selectively permeable to ions allows ions to pass through while restricting (or eliminating) the passage of solids. For example, in some embodiments, a metal ion (e.g., $Ca^{2+}$) may pass through while a solid metal salt, a metal oxide or a precipitate (e.g., solid metal hydroxide, such as solid $Ca(OH)_2$ or precipitated silica) is restricted (or does not pass through at all).

In some embodiments, the membrane selectively permeable to ions allows ions to pass through but restricts (or eliminates) the passage of non-ionic compounds. In certain embodiments, the membrane selectively permeable to ions allows ions to pass through at a first rate and allows non-ionic compounds to pass through at a second rate, which is lower than the first rate. In some embodiments, the membrane selectively permeable to ions allows certain ions to pass through but restricts (or eliminates) the passage of other ions. In certain embodiments, the membrane selectively permeable to ions allows certain ions to pass through at a first rate and allows other ions to pass through at a second rate, which is slower than the first rate. In some embodiments, membranes selectively permeable to ions may allow certain metal ions to pass through but restricts (or eliminates) the passage of others (or allows certain metal ions to pass through faster than others), may allow $H^+$ to pass through but restricts (or eliminates) the passage of $OH^-$ (or allows $H^+$ to pass through faster than $OH^-$) may allow $OH^-$ to pass through but restricts (or eliminates) the passage of $H^+$ (or allows $OH^-$ to pass through faster than $H^+$), may allow metal ions to pass through but restricts (or eliminates) the passage of $H^+$ and/or $OH^-$ (or allows metal ions to pass through faster than $H^+$ and/or $OH^-$), and/or may allow $H^+$ and/or $OH^-$ ions to pass through but restricts (or eliminates)

the passage of metal ions (or allows $H^+$ and/or $OH^-$ ions to pass through faster than metal ions).

For example, in some embodiments, the membrane selectively permeable to ions is permeable to $OH^-$ ions but relatively less permeable to $Ca^{2+}$ ions, while the membrane selectively permeable to ions is permeable to $Ca^{2+}$ ions but relatively less permeable to $OH^-$ ions. In this example, $Ca^{2+}$ from the first region (e.g., acidic region) could diffuse through the membrane selectively permeable to ions into the separate chamber but could not diffuse through the membrane selectively permeable to ions into the second region (e.g., alkaline region). Additionally, in this example, $OH^-$ ions from the second region (e.g., alkaline region) could diffuse through the membrane selectively permeable to ions into the separate chamber but could not diffuse through the membrane selectively permeable to ions. Thus, in this example, $Ca^{2+}$ and $OH^-$ is would only be able to react, forming solid $Ca(OH)_2$, in the separate chamber, preventing solid $Ca(OH)_2$ from forming on the cathode or anode. Accordingly, in some embodiments, the one or more membranes selectively permeable to ions could prevent solid (e.g., solid metal hydroxide, such as solid $Ca(OH)_2$ from precipitating on the first electrode (e.g., cathode), prevent solid (e.g., solid metal hydroxide, such as solid $Ca(OH)_2$ from passivating the first electrode (e.g., cathode); and/or prevent two different solids—the chemical compound (e.g., a metal salt, metal oxide) and the precipitate (e.g., a solid hydroxide, such as a solid metal hydroxide, such as solid $Ca(OH)_2$ from contaminating each other.

In certain embodiments, the reactor is directed toward the production of a calcined, or decomposed, mineral or metal oxide or metal salt through electrochemical and chemical means. In some embodiments, the use of fossil fuels for production of thermal energy, and the associated production of greenhouse gases (e.g., $CO_2$) or gases that are atmospheric pollutants, is reduced or avoided through the use of such a reactor in place of traditional thermal calcination that involves heating of the mineral or metal salt to decompose it.

In other embodiments microorganisms or biological agents designed to aid in the process of mineral dissolution can be combined with the solutions described above such as water, acid, base or any combination thereof, used to dissolve, leach or separate the elements or compounds contained within the mineral. These microorganisms break down minerals by secreting acids, producing enzymes, and consuming minerals, especially the crystalline portion of the mineral, thus allowing for faster mineral dissolution. These bacteria consume Fe(II), a type of iron atom, that is found in abundance in the hyaloclastites and other type of lava quenched by water. Such microorganism or biological agents may be one or more of bacteria, microbes, fungi, yeast, algae or omycetes. Among these types of microorganism bacillus megatherium N-7, bacillus aryabhattai, iron-oxidizing bacteria, cyanobacteria or any other types of microorganism or biological agents may be used in accordance with the present invention. Microbes produce ligands such as sideophores that bind to metal ion making them more soluble and promoting dissolution. Some microorganisms produce organic acid such as lactic acid which can dissolve elements or compounds contained within the calcium-iron aluminosilicate mineral.

Certain aspects are related to systems for producing cement. Other aspects are related to systems for producing slaked lime, lime or dolomitic lime. Certain aspects are related to systems for producing hydroxides and mineralizing carbon dioxide. Other aspects are related to systems for producing microporous absorbent materials such as zeolites and MOFs. Certain aspects are related to systems for producing pozzolans. Other aspects are related to systems for producing alumina, silica, iron and separating the balance of the elements or compounds contained in the dissolved hyaloclastite solution. In some embodiments, the system comprises a reactor. In certain embodiments, the reactor comprises any of the reactor embodiments disclosed above or elsewhere herein, or combinations thereof.

According to some embodiments, a kiln is downstream from the reactor, reactor outlet, and/or one or more apparatuses. According to certain embodiments, the system further comprises a heater between the reactor, reactor outlet, and/or one or more apparatuses and the kiln inlet. Examples of heaters include devices that heat or dehydrate the substance placed inside it. In some embodiments, the reactor outlet is attached directly to the kiln inlet.

In certain embodiments, the kiln inlet is configured to receive at least a portion of the solid calcium hydroxide and/or solid calcium oxide derived from at least a portion of the solid calcium hydroxide. For example, in some embodiments, calcium hydroxide is collected from the reactor, reactor outlet, and/or more apparatuses and the reactor, reactor outlet, and/or more apparatuses is attached directly to the kiln inlet, such that the kiln inlet is configured to receive at least a portion of the solid calcium hydroxide. In certain embodiments, calcium hydroxide is collected from the reactor, reactor outlet, and/or more apparatuses, and is transported to the heater. In some embodiments, the heater converts the calcium hydroxide to calcium oxide, in full or in part. In some embodiments, the kiln inlet is configured to receive at least a portion of the solid calcium hydroxide and/or solid calcium oxide derived from at least a portion of the solid calcium hydroxide from the heater.

In accordance with some embodiments, the kiln is configured to heat the $Ca(OH)_2$ (e.g., solid calcium hydroxide) and/or lime (e.g., solid calcium oxide) and/or a reaction product thereof as part of a cement-making process. In some embodiments, heating the $Ca(OH)_2$ and/or lime as part of a cement-making process comprises heating the $Ca(OH)_2$ and/or lime in the kiln with other compounds such as alumina, silica and iron oxide. For example, the $Ca(OH)_2$ and/or lime can be heated in the kiln with $SiO_2$, $Al_2O_3$, FeO either recovered from the electrolyzer, contained within the hyaloclastite chemical composition or from other minerals typically used in the clinker manufacturing process.

Certain aspects are related to methods of forming precipitates in a spatially varying chemical composition gradient (e.g., spatially varying pH gradient). According to some embodiments, the method is performed in a reactor and/or system as described in association with any of the embodiments disclosed above or elsewhere herein, or combinations thereof.

In accordance with some embodiments, the method comprises transporting a chemical compound (e.g., a calcium-iron-aluminosilicate, a metal salt) to a first region (e.g., an acidic region) of the spatially varying chemical composition gradient (e.g., the spatially varying pH gradient). In certain embodiments, the metal salt comprises calcium-iron-aluminosilicate. According to some embodiments, the metal carbonate comprises calcium carbonate, magnesium carbonate, and/or sodium carbonate. For example, in accordance with some embodiments, the method comprises transporting calcium-iron-aluminosilicate to a first region (e.g., an acidic region) of the spatially varying pH gradient.

In accordance with certain embodiments, the chemical compound (e.g., the metal salt) is dissolved and/or reacted in a liquid within the spatially varying chemical composition gradient (e.g., spatially varying pH gradient). Non-limiting examples of liquids include non-aqueous or aqueous solutions. Examples of non-aqueous solutions include solutions comprising a non-aqueous solvent and an electrolyte salt and/or solution comprising an ionic liquid. Examples of aqueous solutions include solutions comprising water and an electrolyte salt. Examples of electrolyte salts include $CaSO_4$ and $CaClO_4$. In some embodiments, the chemical compound (e.g., the metal salt) is dissolved and reacted within the liquid within the spatially varying chemical composition gradient (e.g., the spatially varying pH gradient). For example, in some embodiments, calcium carbonate is dissolved and/or reacted in a liquid within the spatially varying chemical composition gradient (e.g., the spatially varying pH gradient). In some embodiments, calcium-iron-aluminosilicate is dissolved and reacted within the liquid within the spatially varying chemical composition gradient (e.g., the spatially varying pH gradient). For example, the chemical compound (e.g., metal salt) (e.g., calcium-iron-aluminosilicate) is added to the first region (e.g., acidic region), and the chemical compound (e.g., metal salt) (e.g., calcium-iron-aluminosilicate) reacts with the protons in the first region (e.g., acidic region), such that the chemical compound (e.g., metal salt) (e.g., calcium-iron-aluminosilicate) is dissolved, forming one or more elements, such as a metal (e.g., forming $Ca^{2+}$ and $HCO_3^-$, or $Ca^{2+}$ and $H_2CO_3$). In some embodiments, the one or more elements (e.g., a metal, such as $Ca^{2+}$) moves to the second region (e.g., alkaline region), where it reacts with the hydroxide ions in the second region (e.g., alkaline region), forming a precipitate (e.g., a metal precipitate, such as $Ca(OH)_2$.

In some embodiments, the first region comprises an acidic region. In certain embodiments, the second region comprises an alkaline region. According to some embodiments, the chemical compound (e.g., calcium-iron-aluminosilicate or metal salt) is dissolved in the acidic region and the one or more elements (e.g., a metal, such as $Ca^{2+}$) reacts in the alkaline region. In other embodiments, the first region comprises an alkaline region. In some embodiments, the second region comprises an acidic region. In accordance with certain embodiments, the chemical compound (e.g., metal salt) is dissolved in the alkaline region and the one or more elements (e.g., a metal, such as $Ca^{2+}$) reacts in the acidic region.

According to some embodiments, the method comprises collecting a precipitate from a second region (e.g., an alkaline region) of the spatially varying chemical composition gradient (e.g., spatially varying pH gradient). In certain embodiments, the precipitate comprises a metal precipitate, such as a metal hydroxide. Non-limiting examples of metal hydroxides include sodium hydroxide, calcium hydroxide, and magnesium hydroxide. For example, in the example given above, the one or more elements (e.g., a metal, such as $Ca^{2+}$) moves to the second region (e.g., alkaline region), where it reacts with the hydroxide ions in the second region (e.g., alkaline region), forming a precipitate (e.g., a metal precipitate, such as $Ca(OH)_2$). Accordingly, in some embodiments, the method comprises collecting solid calcium hydroxide from an alkaline region of the spatially varying chemical composition gradient (e.g., spatially varying pH gradient). Non-limiting examples of ways in which the one or more elements (e.g., the metal) can move to the second region (e.g., alkaline region) include diffusion, transportation by convection, and/or transportation by flow.

In accordance with certain embodiments, the precipitate comprises one or more elements (e.g., Ca, Mg, Na, K, Si, Al, Fe, Ti) from the chemical compound (e.g., hyaloclastite,) dissolved and/or reacted within the spatially varying chemical composition gradient (e.g., spatially varying pH gradient). In some embodiments, the one or more elements comprises a metal element.

As used herein, the term "metal" refers to metallic metal, a metal ion, a metal compound, metal oxide or a metal salt. Also as used herein, the term "element" refers to chemical elements such as Ca, N a, etc., to ionic forms of elements, such as $Ca^{2+}$ and $Na^+$ and to elements in a compound form, such as $Ca(OH)_2$, NaOH, etc.

As used herein, the term "hyaloclastite" can be interchangeable with the term "calcium-iron aluminosilicate".

As used herein, the term "weak acid" refers to an acid that have been diluted with water so that it's of a lower strength than the same acid in an undiluted form or it may refer to a weak acid such as a formic acid, benzoic acid, carbonic acid, citric acid, acetic acid, trichloroacetic acid, hydrofluoric acid, hydrocyanic acid, hydrogen sulfide, methanoic acid, nitrous acid, sulfouros acid, lactic acid, oxalic acid, phosphoric acid, water, ionized water, energetically modified water or conjugate acids of weak bases. The term "weak acid" also refers to the combination of one or more acids, weak acids or diluted acids from any one of the acids as described above.

As used herein, the term "acid" or "acidic solution" refers to an acid or an acidic solution or a combination of one or more acids or one or more acidic solutions as described above.

As used herein, the term "weak base" refers to a base that have been diluted with water so that it's of a lower strength that the same base in an undiluted form or it may refer to a weak base such as aluminum hydroxide, ammonia, ammonium hydroxide, methylamine, trimethyl ammonia, magnesium hydroxide, pyridine, ammonium hydroxide, HS- ion, Sodium bicarbonate, water, ionized water, energetically modified water or conjugates of weak acids. The term "weak base" also refers to the combination of one or more bases, weak bases or diluted bases from any one of the bases as described above.

As used herein, the term "base" or "alkaline solution" refers to a base or an alkaline solution or a combination of one or more bases or alkaline solutions as described above.

In some embodiments, the precipitate comprises a metal cation from the metal salt that was dissolved and/or reacted within the spatially varying chemical composition gradient (e.g., spatially varying pH gradient), and that metal cation is ionic ally bonded to an anion within the precipitate. For example, in certain embodiments, the solid calcium hydroxide comprises calcium from the calcium-iron-aluminosilicate dissolved and/or reacted within the spatially varying chemical composition gradient (e.g., spatially varying pH gradient).

According to certain embodiments, the method is a method of making cement. According to certain embodiments, the method comprises heating the $Ca(OH)_2$ (e.g., solid calcium hydroxide) and/or lime (e.g., solid calcium oxide) and/or a reactant product thereof within a kiln to make cement. In some embodiments, this comprises taking the calcium hydroxide from the reactor and placing it directly in the kiln. Alternatively, in certain embodiments, there are steps in between collecting the calcium hydroxide and heating in the kiln (e.g., a heater). In some embodiments, the heater converts the calcium hydroxide to its calcium oxide, and then the calcium hydroxide and/or the oxide calcium oxide are heated in the kiln. In some embodiments, the heater converts 100% (by weight) of the calcium hydroxide to its calcium oxide and only the calcium oxide is heated in the kiln. In other embodiments, the heater converts 10% or more, 20% or more, 30% or more, 40% or more, 50% or more, up to 90%, up to 95%, or up to 99% (by weight) of the calcium hydroxide to calcium oxide. Combinations of these ranges are also possible (e.g., 10% to 100% (by weight) inclusive). In some embodiments, both the calcium hydroxide and calcium oxide are heated in the kiln. Examples of heaters include devices that heat or dehydrate the substance placed inside it.

In some embodiments, heating the $Ca(OH)_2$ (e.g., solid calcium hydroxide) and/or lime (e.g., solid calcium oxide) and/or a reactant product thereof within a kiln to make cement comprises heating the s $Ca(OH)_2$ (e.g., solid calcium hydroxide) and/or lime (e.g., solid calcium oxide) and/or a reactant product thereof in the kiln with other compounds such as alumina, silica and iron. For example, the $Ca(OH)_2$ (e.g., solid calcium hydroxide) and/or lime (e.g., solid calcium oxide) and/or a reactant product thereof could be heated in the kiln with $SiO_2$, $Al_2O_3$, FeO or other minerals. The $SiO_2$, $Al_2O_3$, FeO and other minor elements used can be the product of the hyaloclastite dissolution and separated from the solution once the hydroxide group(s) have been removed.

In certain embodiments, there are subsequent steps after heating the $Ca(OH)_2$ (e.g., solid calcium hydroxide) and/or lime (e.g., solid calcium oxide) and/or a reactant product thereof within a kiln before the cement is made. For example, in certain embodiments, there is a cooling step after the kiln.

According to some embodiments, the method is part of a batch process. In certain embodiments, the precipitate (e.g., a metal hydroxide, such as silica, alumina, $Ca(OH)_2$) is periodically collected from the reactor. According to certain embodiments, the method is performed continuously. In some embodiments, the chemical compound (e.g., a calcium-iron-aluminosilicate, a hyaloclastite, metal salt, such as a metal carbonate, such as $CaCO_3$) is added continuously or periodically at the anode and/or first region (e.g., acidic region). In certain embodiments, the precipitate (e.g., a metal hydroxide, such as $Ca(OH)_2$) is collected continuously or periodically. Non-limiting examples of collecting the precipitate (e.g., a metal hydroxide, such as $Ca(OH)_2$) include collecting it with a flow stream and/or allowing it to deposit on a surface from which it is continuously or periodically collected.

According to some embodiments, the method is part of a flow process. In certain embodiments, the precipitate (e.g., a metal hydroxide, such as $Ca(OH)_2$) is continuously collected from the reactor. According to certain embodiments, the method is performed continuously. In some embodiments, the chemical compound (e.g., a calcium-iron-aluminosilicate, a hyaloclastite, metal salt, such as a metal carbonate, such as $CaCO_3$) is added continuously at the anode and/or first region (e.g., acidic region). In certain embodiments, the precipitate (e.g., a metal hydroxide, such as $Ca(OH)_2$) is collected continuously. Non-limiting examples of collecting the precipitate (e.g., a metal hydroxide, such as $Ca(OH)_2$) include collecting it with a flow stream and/or allowing it to deposit on a surface from which it is continuously collected.

According to some embodiments, the reactors, systems, and methods described herein display one or more beneficial properties and have one or more applications. For example, some embodiments of the reactors, systems, and methods described herein may be used for producing lime (e.g., hydrated lime or quick lime). For example, in some embodiments, the reactor is used in place of calcination in a traditional lime production process.

According to some embodiments, the reactors, systems, and methods described herein display one or more beneficial properties and have one or more applications. For example, some embodiments of the reactors, systems, and methods described herein may be used for producing cement (e.g., Portland cement). For example, in some embodiments, the reactor is used in place of calcination in a traditional cement production process.

In some embodiments, $Ca(OH)_2$ produced by the methods, reactors, and/or systems described herein can be used to produce CaO for cement making, instead of traditional calcination of $CaCO_3$ to CaO. The thermal dehydration of $Ca(OH)_2$ to CaO has a 25% lower minimum energy requirement (71.2 kJ/mol) than thermal calcination of $CaCO_3$ to CaO (97.0 kJ/mol).

In accordance with certain embodiments, the reactor and/or system is powered, in part or in full, by renewable electricity (e.g., solar energy, wind energy, and/or hydroelectric power.).

In one embodiment, the electrolytically-driven chemical reactor comprises an electrolysis cell for the electrolysis of water. In some embodiments, such a cell, when performing electrolysis, produces a high pH at the cathode, where a hydrogen evolution reaction (HER) is taking place and producing OH-, and produces a low pH at the anode, where an oxygen evolution reaction (QER) is taking place and producing H+. A gradient in pH is therefore produced, in accordance with certain embodiments, between the cathode and anode. In other such electrolytic cells, a gradient in other species may be produced depending on the nature of the electrolysis reaction.

In one embodiment, said pH gradient is used to dissolve a calcium-iron-aluminosilicate at low pH in the vicinity of the anode, and to precipitate a metal hydroxide as the metal ion diffuses towards the higher pH environment at the cathode. In some such embodiments, as the calcium-iron-aluminosilicate is dissolved near the anode, metal cations of the calcium-iron-aluminosilicate are produced in solution. These then diffuse, in accordance with some such embodiments, or are optionally transported by convection or flow, toward the high pH environment produced by HER at the cathode. In accordance with some embodiments, reaction of the metal ion with OH- ions produced at the cathode results in the precipitation of the metal hydroxide. The electrochemical and chemical reactions occurring at each electrode, in accordance with some embodiments, and the overall reaction. Almost any calcium-iron-aluminosilicate, hyaloclastite or mixtures of calcium-iron-aluminosilicate can be converted to its hydroxide or hydroxides through such a process, with non-limiting examples of hyaloclastite, lava and other minerals. In some such embodiments, concurrently with the production of the metal hydroxide from the starting calcium-iron-aluminosilicate mineral, hydrogen gas is liberated at the cathode and a mixture of oxygen gas and carbon dioxide gas if any is liberated at the anode.

In one or more embodiments, the reactor is operated in a batch manner whereby the product metal hydroxide is periodically collected. In one or more embodiments, the reactor is operated in a continuous manner such that additional calcium-iron-aluminosilicate is added continuously or periodically at the anode, and the precipitated metal hydroxide is continuously or periodically removed from the reaction zone. For example, precipitated metal hydroxide may be removed from the reaction zone using a flow stream and collected, or the precipitate may be allowed to deposit on a surface from which it is continuously or periodically removed while the reactor continues to operate.

In one or more embodiments, the reactor is operated in a flow process manner whereby the product metal hydroxide is collected continuously. In one or more embodiments, the is reactor is operated in a continuous manner such that additional calcium-iron-aluminosilicate is added continuously at the anode, and the precipitated metal hydroxide is continuously removed from the reaction zone. For example, precipitated metal hydroxide may be removed from the reaction zone using a flow stream and collected, or the precipitate may be allowed to deposit on a surface from which it is continuously removed while the reactor continues to operate.

In some embodiments, the hydrogen and/or oxygen gas produced by the electrochemical reactor is beneficially used or sold. In some embodiments, the hydrogen and oxygen are reacted in a fuel cell to produce electric power. In some embodiments, the hydrogen is combusted as a fuel or as a component of a fuel for the purpose of heating a reactor or kiln or furnace. In other embodiments, the hydrogen and oxygen gas produced by the electrochemical reactor are re-combined to create water, energized water, ionized water, an acid or a base.

In some embodiments, the calcium hydroxide, also known as slaked lime, and/or calcium oxide, which is reacted with water to produce slaked lime, produced herein (e.g., from a precipitation reaction) can be used in applications including but not limited to paper making, flue gas treatment carbon capture, plaster mixes and masonry (including Pozzolan cement), soil stabilization, pH adjustment, water treatment, waste treatment, and sugar refining. The following are non-limiting examples of uses of calcium hydroxide (also known as slake lime) and/or calcium oxide (also known as lime).

In some embodiments, slaked lime and/or lime produced by the reactors, systems, and/or methods disclosed herein is used to make magnesium hydroxide. In some cases, the addition of slaked lime to solutions containing magnesium ions(e.g. seawater and/or brine solutions) causes magnesium hydroxide to precipitate from solution.

In some embodiments, slaked lime and/or lime produced by the reactors, systems, and/or methods disclosed herein is used to make alkali carbonates and/or bicarbonates from alkali chlorides in the ammonia-soda process. In this process, in some cases, lime and/or slaked lime is reacted with ammonium chloride (and/or ammonium chlorides, such as isopropyl ammonium chloride) to regenerate ammonia (and/or amines, such as isopropyl amine) after the reaction of ammonia (and/or the amine) with an alkali chloride. In some cases, the resulting calcium chloride can be reacted with the alkaline stream from the reactors, systems, and/or methods disclosed herein, to regenerate the slaked lime.

In some embodiments, slaked lime and/or lime produced by the reactors, systems, and/or methods disclosed herein is used to make alkali hydroxides from alkali carbonates, in a process often called causticizing or re-causticizing. In some cases, slaked lime is reacted with alkali carbonates to produce alkali hydroxides and calcium carbonate. The process of causticizing alkali carbonates is a feature of several other processes, in some instances, including the purification of bauxite ore, the processing of carbolic oil, and the Kraft liquor cycle (in which "green liquor", containing sodium carbonate, reacts with slaked lime to form "white liquor", containing sodium hydroxide).

In some embodiments, slaked lime and/or lime produced by the reactors, systems, and/or methods disclosed herein is used as a binder, bonding and/or stabilizing agent in the fabrication of silica, silicon carbide and/or zirconia refractories.

In some embodiments, the alumina is precipitated as a byproduct of the hydrolysis process above produced by the reactors, systems, and/or methods disclosed herein is used to make aluminum oxide.

In some embodiments, silica is precipitated as a byproduct of the hydrolysis process above produced by the reactors, systems, and/or methods disclosed herein is used to make precipitated silica.

In some embodiments, the iron oxide is precipitated as a byproduct of the hydrolysis process above produced by the reactors, systems, and/or methods disclosed herein is used to make iron oxide.

In some embodiments, the titanium oxide is precipitated as a byproduct of the hydrolysis process above produced by the reactors, systems, and/or methods disclosed herein is used to make titanium oxide.

In some embodiments, the precipitate is a byproduct of the hydrolysis process above produced by the reactors, systems, and/or methods disclosed herein is used to extract one or more minor elements. In certain embodiments, the minor element is in crystalline, amorphous, nano particle, colloidal or nano-crystalline form and/or a mixture thereof. In some embodiments, the minor elements are one or more of rare earth elements, Ag, Al, As, Au, Ba, Ca, Cd, Cl, Co, Cr, Cu, Fe, Hg, K, M g, M n, M o, Na, Ni, P, Pb, S, Sb, Se, Si, Sn, Ti, TI, V, Wand/or Zn (e.g., in elemental form, as a salt or as an oxide).

Example 1

A calcium-iron-aluminosilicate mineral within the chemical composition preferably comprises approximately 30 to approximately 57 percent by weight $SiO_2$, approximately 10 to approximately 18 percent by weight $Al_2O_3$, approximately 8 to approximately 18 percent by weight $Fe_2O_3$, and approximately 4 to approximately 25 percent by weight CaO and preferably wherein the sum of the $Al_2O_3+Fe_2O_3$ is between approximately 20 to approximately 35 percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25 ideally or approximately 1.5 and an amorphous content of approximately 50% and crystalline content of approximately 50% is ground to a volume-based mean particle size of less than or equal to approximately 100 microns.

Step 1 or Phase 1 the ground calcium-iron-aluminosilicate mineral is combined with a first acid, such as hydrochloric acid, thereby forming a first salt, where the first salt is calcium chloride, aqueous magnesium chlorite and/or the aqueous aluminum chloride from a first solid fraction comprising the solid silica. A hydrolysis reaction is run in an electrochemical cell in accordance with the present invention comprising a first electrode and second electrode, such that base and hydrogen gas are produced at the first electrode (cathode) and acid and oxygen gas are produced at the second electrode (anode). The base is collected from the reactor through a conduit to a first apparatus in fluidic connection with the reactor, and the base is stored in the apparatus. The acid is collected from the reactor through a conduit to a second apparatus in fluidic connection with the reactor, and the acid is stored in that apparatus. When desired, the base is transferred to a third apparatus in fluidic connection with the first apparatus and the acid is transferred to a fourth apparatus in fluidic connection with the second apparatus. The acid is then used to dissolve the calcium-iron-aluminosilicate in a chemical dissolution in the fourth apparatus to form $Ca^{2+}$ ions and $Mg^{2+}$ ions and the like. The time and temperature of the first reaction is controlled so that a portion of the calcium-iron-aluminosilicate mineral will dissolve and another portion of the mineral may not dissolve in the first acid. Alternatively, the calcium oxide from the matrix of the calcium-iron-aluminosilicate mineral may dissolve first either from the amorphous or the crystalline portion of the calcium-iron-aluminosilicate mineral leaving the rest of the elemental composition in a state close to the initial crystalline or amorphous state minus the leached elements. In other words, it may be desirable to selectively leach out or precipitate only the desired element to create the first salt based on the ratio of amorphous vs. crystalline make-up of the of the calcium-iron-aluminosilicate mineral. The undissolved portion of the mineral, ideally containing the alumina, silica and iron oxide is then separated and used as a pozzolan especially if in an amorphous matrix. Optionally, the undissolved portion of the mineral, ideally containing the alumina, silica and iron oxide can be separated from the first chlorite salt and used in the Step 3 below to combine in with the calcium sulfate or sulfite to manufacture lime, dolomitic lime or hydraulic cement containing calcium oxide, alite and/or belite.

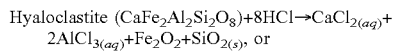

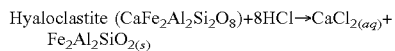

Step 2 or Phase 2 comprises reacting the first chlorite salt such as at least the aqueous calcium chloride, The $Ca^{2+}$ ions are then transported to the third apparatus (which is in fluidic connection with the fourth apparatus), where the base is used in a precipitation reaction with the Ca2+ ions to form $Ca(OH)_2$.

Calcium hydroxide is removed from the apparatus and used in whatever desired application.

Example 2

A calcium-iron-aluminosilicate mineral within the chemical composition shown in Example 1 above is processed in accordance with Steps 1 and 2 as described in Example 1 above. An additional Step 3 is added to the process as follows:

Step 3 or Phase 3 of the process will be as follows: a thermally treating process, comprising heating or dehydrating the calcium hydroxide $Ca(OH)_2$, for example, with a kiln, to form calcium oxide. The heating process of Step 3 to obtain calcium oxide from calcium hydroxide decreases to about 900° C. in the presence of the silica, alumina and iron oxide. The heating process of Step 3 can be performed in a conventional kiln, a fluid bed, such as a circulating fluid bed, or a vibratory plate microwave oven. However, a circulating fluid bed is preferred. The fuel used in a kiln or fluid bed can be a hydrocarbon fuel such as coal, natural gas (methane) or coke. Optionally one or more of the hydrogen or oxyfuel generated by the reactor described above can be used alone or in combination with a hydrocarbon fuel or with any other type fuel. This is fed to a simple rotary kiln and burned to produce clinker from the hot end and an exhaust gas. Firstly, at 500-700° C., the heat dehydrates the calcium hydroxide and initiates the calcium oxide formation process.

Calcium oxide is removed from the kiln and used in any desired application.

EXAMPLE 3

A calcium-iron-aluminosilicate mineral within the chemical composition shown in Example 1 above is processed in accordance with Steps 1 and 2 as described in Example 1 above. An additional Step 3 is added to the process as follows:

Step 3 or Phase 3 of the process will be as follows: a thermally treating process, comprising heating or dehydrating the calcium hydroxide $Ca(OH)_2$ to be used in a cement-making process, for example, with a kiln, to form calcium oxide. Optionally the calcium oxide is first mixed with sufficient amount of alumina, silica and iron oxide in proportions required to make a hydraulic cement containing calcium oxide, and/or alite and/or belite. The source of the alumina, silica and iron oxide can be the undissolved co-product of Step 1, as described above, any source of alumina, silica and iron currently used in the portland cement manufacture or the initial calcium-iron-aluminosilicate mineral in appropriate ratios The heating process of Step 3 can be performed in a conventional kiln, a fluid bed, such as a circulating fluid bed, or a vibratory plate microwave oven. However, a circulating fluid bed is preferred. The fuel used in a kiln or fluid bed can be a hydrocarbon fuel such as coal, natural gas (methane) or coke. Optionally, one or more of the hydrogen or oxyfuel generated by the reactor described above can be used alone or in combination with a hydrocarbon fuel or with any other type fuel. This is fed to a simple rotary kiln and burned to produce clinker from the hot end and an exhaust gas. Firstly, at 500-700° C., the heat dehydrates the calcium hydroxide and initiates the calcium oxide formation process.

Next, at a temperature of 800-1000° C. the rest of the calcium hydroxide reacts with the alumina, silica and iron oxide mineral from either Step or Phase 1 of the process or from the initial calcium-iron-aluminosilicate mineral, in the presence of low-temperature melts, to produce belite and calcium oxide.

Finally, at temperatures above 1250° C., in the burning zone, most of the free calcium oxide reacts with some of the belite to form alite.

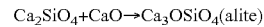 Equation:—

The clinker is rapidly cooled in the usual manner to preserve the reactive high-temperature minerals. The exhaust gases are de-dusted and cooled by water-washing, further cleaned with mist precipitators, then dried.

The clean dry gases is passed through blowers (G) into heat exchangers (H) in which hot product gases are cooled while the input gas is heated to 400-410° C. The gas then enters a catalyst-packed converter (I). The usual catalyst is doped vanadium pentoxide. The oxidation is exothermic, so in order to prevent the temperature from running out of control, heat is exchanged with the cold input gas. Several cycles of heat exchange and conversion take place. The blowers are sized to provide ample draught for the kiln system and to deliver the 200 kPa required to push the gas through the multiple resistant catalyst beds.

The final products are hot and required water cooling to bring them to handleable temperature for storage.

Example 4

A basaltic hyaloclastite mineral within the chemical composition preferably comprises approximately 45 to approximately 50 percent by weight $SiO_2$, approximately 10 to approximately 18 percent by weight $Al_2O_3$, approximately 8 to approximately 18 percent by weight $Fe_2O_3$, and approximately 8 to approximately 15 percent by weight CaO and preferably wherein the sum of the $Al_2O_3+Fe_2O_3$ is between approximately 20 to approximately 35 percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25 ideally or approximately 1.5 and an amorphous content of approximately 50% and crystalline content of approximately 50% is ground to a volume-based mean particle size of less than or equal to approximately 100 microns.

Step 1 or Phase 1 the ground basaltic hyaloclastite mineral is combined with a first acid, such as hydrochloric acid, thereby forming a first salt, where the first salt is calcium chloride, aqueous magnesium chlorite and/or the aqueous aluminum chloride from a first solid fraction comprising the solid silica. A hydrolysis reaction is run in an electrochemical cell in accordance with the present invention comprising a first electrode and second electrode, such that base and hydrogen gas are produced at the first electrode (cathode) and acid and oxygen gas are produced at the second electrode (anode). The base is collected from the reactor through a conduit to a first apparatus in fluidic connection with the reactor, and the base is stored in the apparatus. The acid is collected from the reactor through a conduit to a second apparatus in fluidic connection with the reactor, and the acid is stored in that apparatus. When desired, the base is transferred to a third apparatus in fluidic connection with the first apparatus and the acid is transferred to a fourth apparatus in fluidic connection with the second apparatus. The acid is then used to dissolve the basaltic hyaloclastite in a chemical dissolution in the fourth apparatus to form $Ca^{2+}$ ions and $Mg^{2+}$ ions and the like. The time and temperature of the first reaction is controlled so that a portion of the basaltic hyaloclastite will dissolve and another portion of the mineral may not dissolve in the first acid. Alternatively, the calcium oxide from the matrix of the basaltic hyaloclastite mineral may dissolve first either from the amorphous or the crystalline portion of the basaltic hyaloclastite mineral leaving the rest of the elemental composition in a state close to the initial crystalline or amorphous state minus the leached elements. In other words, it may be desirable to selectively leach out or precipitate only the desired element to create the first salt based on the ratio of amorphous vs. crystalline make-up of the of the basaltic hyaloclastite mineral. The undissolved portion of the mineral, ideally containing the alumina, silica and iron oxide is then separated and used as a pozzolan especially if in an amorphous matrix. Optionally, the undissolved portion of the mineral, ideally containing the alumina, silica and iron oxide can be separated from the first chlorite salt and used in the Step 3 below to combine in with the calcium sulfate or sulfite to manufacture lime, dolomitic lime or hydraulic cement containing calcium oxide, alite and/or belite.

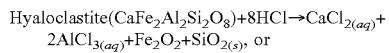

Step 2 or Phase 2 comprises reacting the first chlorite salt such as at least the aqueous calcium chloride, The $Ca^{2+}$ ions are then transported to the third apparatus (which is in fluidic connection with the fourth apparatus), where the base is used in a precipitation reaction with the Ca2+ ions to form $Ca(OH)_2$.

Calcium hydroxide is removed from the apparatus and used in whatever desired application.

Example 5

A basaltic hyaloclastite mineral with the chemical composition described in Example 4 above is processed in accordance with Steps 1 and 2 as described in Example 4 above. An additional Step 3 is added to the process as follows Step 3 or Phase 3 of the process will be as follows: a thermally treating process, comprising heating or dehydrating the calcium hydroxide $Ca(OH)_2$, for example, with a kiln, to form calcium oxide. The heating process of Step 3 to obtain calcium oxide from calcium hydroxide decreases to about 900° C. in the presence of the silica, alumina and iron oxide. The heating process of Step 3 can be performed in a conventional kiln, a fluid bed, such as a circulating fluid bed, or a vibratory plate microwave oven. However, a circulating fluid bed is preferred. The fuel used in a kiln or fluid bed can be a hydrocarbon fuel such as coal, natural gas (methane) or coke. Optionally one or more of the hydrogen or oxyfuel generated by the reactor described above can be used alone or in combination with a hydrocarbon fuel or with any other type fuel. This is fed to a simple rotary kiln and burned to produce clinker from the hot end and an exhaust gas. Firstly, at 500-700° C., the heat dehydrates the calcium hydroxide and initiates the calcium oxide formation process.

Calcium oxide is removed from the kiln and used in any desired application.

Example 6

A basaltic hyaloclastite mineral with the chemical composition shown in Example 4 above is processed in accordance with Steps 1 and 2 as described in Example 4 above. An additional Step 3 is added to the process as follows Step 3 or Phase 3 of the process will be as follows: a thermally treating process, comprising heating or dehydrating the calcium hydroxide $Ca(OH)_2$ to be used in a cement-making process, for example, with a kiln, to form calcium oxide. Optionally, the calcium oxide is first mixed with a sufficient amount of alumina, silica and iron oxide in proportions required to make a hydraulic cement containing calcium oxide, and/or alite and/or belite. The source of the alumina, silica and iron oxide can be the undissolved co-product of Step 1, as described above, any source of alumina, silica and iron currently used in the portland cement manufacture or the initial basaltic hyaloclastite mineral in appropriate ratios. The heating process of Step 3 can be performed in a conventional kiln, a fluid bed, such as a circulating fluid bed, or a vibratory plate microwave oven. However, a circulating fluid bed is preferred. The fuel used in the kiln or fluid bed can be a hydrocarbon fuel such as coal, natural gas (methane) or coke. Optionally, one or more of the hydrogen or oxyfuel generated by the reactor described above can be used alone or in combination with a hydrocarbon fuel or with any other type fuel. This is fed to a simple rotary kiln and burned to produce clinker from the hot end and an exhaust gas. First, at 500-700° C., the heat dehydrates the calcium hydroxide and initiates the calcium oxide formation process.

Next, at a temperature of 800-1000° C., the rest of the calcium hydroxide reacts with the alumina, silica and iron oxide mineral from either Step or Phase 1 of the process or from the initial basaltic hyaloclastite mineral, in the presence of low-temperature melts, to produce belite and calcium oxide.

Finally, at temperatures above 1250° C., in the burning zone, most of the free calcium oxide reacts with some of the belite to form alite.

$$Ca_2SiO_4 + CaO \rightarrow Ca_3OSiO_4 \text{(alite)} \qquad \text{Equation:---}$$

The clinker is rapidly cooled in the usual manner to preserve the reactive high-temperature minerals. The exhaust gases are de-dusted and cooled by water-washing, and further cleaned with mist precipitators, then dried.

The clean dry gases are passed through blowers into heat exchangers in which hot product gases are cooled while the input gas is heated to 400-410° C. The gases then enter a catalyst-packed converter. The usual catalyst is doped vanadium pentoxide. The oxidation is exothermic, so in order to prevent the temperature from running out of control, heat is exchanged with the cold input gas. Several cycles of heat exchange and conversion take place. The blowers are sized to provide ample draught for the kiln system and to deliver the 200 kPa required to push the gas through the multiple resistant catalyst beds.

The final products are hot and required water cooling to bring them to handleable temperatures for storage.

Example 7

A calcium-iron-aluminosilicate mineral with the chemical composition preferably comprises approximately 45 to approximately 57 percent by weight $SiO_2$, approximately 10 to approximately 18 percent by weight $Al_2O_3$, approximately 8 to approximately 18 percent by weight $Fe_2O_3$, and approximately 6 to approximately 25 percent by weight CaO and preferably wherein the sum of the $Al_2O_3+Fe_2O_3$ is between approximately 20 to approximately 35 percent by weight, preferably wherein the ratio between the $Al_2O_3$ and the $Fe_2O3$ is approximately 0.75 and approximately 1.50 ideally or approximately 1 and the ratio between the $SiO_2$ and the sum of the $Al_2O_3+Fe_2O_3$ is preferably between approximately 1.25 and 2.25 ideally or approximately 1.5 and an amorphous content of approximately 50% and crystalline content of approximately 50% is ground to a volume-based mean particle size of less than or equal to approximately 150 microns. Step 1 or Phase 1, the ground calcium-iron-aluminosilicate mineral is combined with ionized water at a temperature of 80° C. in a first reactor. The calcium, magnesium and optionally sodium and potassium from the calcium-iron aluminosilicate dissolves to form calcium and magnesium hydroxide and optionally sodium and potassium hydroxide. Carbon dioxide is added to the solution and combined with the hydroxides to create calcium, magnesium, sodium and/or potassium carbonates and precipitates in the first reactor thereby mineralizing carbon dioxide.

The carbonates are removed from the reactor and used for any suitable process or application. The balance of the solution dissolved from the hyaloclastite reaction with the ionized water is removed and further processed in accordance with the present invention or used of any other suitable application.

Example 8

A calcium-iron-aluminosilicate mineral with the chemical composition of Example 7 above is processed is accordance with Example 7 above. The balance of elements left over from the dissolution of the calcium and magnesium are separated from the first reactor in example 7 and placed in a second reactor where it is combined with sulfuric acid. The sulfuric acid further dissolves the balance of the hyaloclastite left over from the first reactor and forms one or more salts and one or more precipitates containing metals and silica. The precipitates from the solid fraction comprises on or more of nano silica and alumina, iron oxide and an ionic-liquid solution containing minor metal and rare earth. The alumina and silica precipitates and optionally titanium are removed using a hydrolysis reaction run in an electrochemical cell in accordance with the present invention comprising whereby the alumina and silica precipitates are removed and minor metals rare earth elements are deposited at the cathode.

The precipitates are removed from the reactor and used for any suitable process or application. The balance of the ionic solution dissolved from the hyaloclastite reaction with the sulfuric acid is removed and further processed in accordance with the present invention or used of any other suitable application.

Example 9

A calcium-iron-aluminosilicate mineral with the chemical composition of Example 7 above is processed in accordance with Examples 7 and 8 above. The precipitated alumina and silica are removed and placed into a reactor suitable to manufacture an aluminosilicate zeolite. Additional minor elements known in the art of making a zeolite such as titanium, magnesium, copper and the like are added to alumina and silica precipitate solution to create a zeolite solution that at a suitable temperature and pressure will create a gel like solution and crystalize into a 3-dimensional zeolite structure.

The zeolite is used to capture and remove carbon dioxide from a coal combustions power plant. The carbon dioxide embedded zeolite is then further combined in an acidic or alkaline solution with a carbonatable mineral to mineralize carbon dioxide as described in U.S. Pat. Nos. 11,884,602; 11,986,769; 12,291,491; and 12,145,882 and U.S. patent application Ser. No. 18/664,661 filed M ay 15, 2024 and Ser. No. 18/421,638 filed Jan. 24, 2024, the disclosures of which are all incorporated herein by reference in their entirety.

Example 10

A calcium-iron-aluminosilicate mineral with the chemical composition of Example 7 above is processed in accordance with Examples 7 and 8 above. The precipitated silica is removed and placed into a reactor suitable to manufacture a silica-based zeolite. Additional minor elements known in the art of making a zeolite such as titanium, magnesium, copper and the like are added to the silica precipitate solution to create a zeolite solution that at a suitable temperature and pressure will create a gel like solution and crystalize into a 3-dimensional zeolite structure suitable for carbon dioxide absorption or any other type of absorption properties.

The zeolite is used to capture and remove carbon dioxide from the flue gas of a coal combustions power plant. The carbon dioxide embedded zeolite is then further combined in an acidic or alkaline solution with a carbonatable mineral to mineralize carbon dioxide as described in U.S. Pat. Nos. 11,884,602; 11,986,769; 12,291,491; and 12,145,882 and U.S. patent application Ser. No. 18/664,661 filed M ay 15, 2024 and Ser. No. 18/421,638 filed Jan. 24, 2024, the disclosures of which are all incorporated herein by reference in their entirety.

Example 11

A calcium-iron-aluminosilicate mineral with the chemical composition of Example 7 above is processed in accordance with Examples 7 and 8 above. A portion of the ionic-liquid solution is removed and placed into a reactor suitable to manufacture a metal-organic framework. Additional minor elements known in the art of making a zeolite such as titanium, magnesium, copper and the like are added to the ionic-liquid solution to create a MOF that at a suitable temperature and pressure The MOF's is used to capture and remove carbon dioxide from the flue gas of a hydrocarbon combustion power plant. The carbon dioxide embedded MOF is then further combined in an acidic or alkaline solution with a carbonatable mineral to mineralize carbon dioxide as described in the U.S. Pat. Nos. 11,884,602; 11,986,769; 12,291,491; and 12,145,882 and U.S. patent application Ser. No. 18/664,661 filed May 15, 2024 and Ser. No. 18/421,638 filed Jan. 24, 2024, the disclosures of which are all incorporated herein by reference in their entirety.

Example 12

A calcium-iron-aluminosilicate mineral with the chemical composition of Example 7 above is processed in accordance with Examples 7 and 8 above. The balance of the ionic solution dissolved from the calcium-iron-aluminosilicate reaction with the sulfuric acid is removed and further processed in a subsequent electrochemical reactor and subjected to an electrowinning process of separating the metals whereby metals are deposited on the cathode. Metals and are removed from the cathode either as metal oxides or in pure form. Rare earth elements can be removed from the anode as oxidized rare earth compounds and used in any suitable application.

Example 13

A calcium-iron-aluminosilicate mineral with the chemical composition of Example 7 above is processed in accordance with Examples 7 and 8 above. The balance of the ionic solution dissolved from the calcium-iron-aluminosilicate reaction with the sulfuric acid is removed and further processed in a subsequent electrochemical reactor. The resulting iron oxide is separated and removed from the reactor and combined with carbon dioxide creating iron carbonite (siderite) thereby mineralizing carbon dioxide.

Example 14

A basaltic hyaloclastite mineral with the chemical composition preferably comprises approximately 45 to approximately 57 percent by weight $SiO_2$, approximately 10 to approximately 18 percent by weight $Al_2O_3$, approximately 8 to approximately 18 percent by weight $Fe_2O_3$, and approximately 6 to approximately 25 percent by weight CaO and preferably wherein the sum of the $Al_2O_3+Fe_2O3$ is between approximately 20 to approximately 35 percent by weight, preferably wherein the ratio between the $Al_2O_3$ and the $Fe_2O3$ is approximately 0.75 and approximately 1.50 ideally or approximately 1 and the ratio between the $SiO_2$ and the sum of the $Al_2O_3+Fe_2O_3$ is preferably between approximately 1.25 and 2.25 ideally or approximately 1.5 and an amorphous content of approximately 50% and crystalline content of approximately 50% is ground to a volume-based mean particle size of less than or equal to approximately 150 microns. Step 1 or Phase 1, the ground hyaloclastite is combined with aqueous hydrochloric acid at a pH of 4 at a temperature of 80° C. in a first reactor. The calcium, magnesium and optionally sodium and potassium from the hyaloclastite dissolves to form calcium and magnesium hydroxide and optionally sodium and potassium hydroxide. Carbon dioxide is added to the solution and combined with the hydroxides to create calcium, magnesium, sodium and/or potassium carbonates and precipitates in the first reactor thereby mineralizing carbon dioxide.

The carbonates are removed from the reactor and used for any suitable process or application. The balance of the solution dissolved from the hyaloclastite reaction with the ionized water is removed and further processed in accordance with the present invention or used of any other suitable application.

Example 15

A basaltic hyaloclastite mineral with the chemical composition of Example 14 above is processed in accordance with Example 14 above. The balance of elements left over from the dissolution of the calcium and magnesium are separated from the first reactor in Example 14 and placed in a second reactor where it is combined with sulfuric acid at a pH of 3. The sulfuric acid further dissolves the balance of the hyaloclastite left over from the first reactor and forms one or more salts and one or more precipitates containing metals and silica. The precipitates from the solid fraction comprises on or more of nano silica and alumina, iron oxide and an ionic-liquid solution containing minor metal and rare earth. The alumina and silica precipitates and optionally titanium are removed using a hydrolysis reaction run in an electrochemical cell in accordance with the present invention comprising whereby the alumina and silica precipitates are removed and minor metals rare earth elements are deposited at the cathode.

The precipitates are removed from the reactor and used for any suitable process or application. The balance of the ionic solution dissolved from the hyaloclastite reaction with the sulfuric acid is removed and further processed in accordance with the present invention or used of any other suitable application.

Example 16

A basaltic hyaloclastite mineral with the chemical composition of Example 14 above is processed in accordance with Examples 14 and 15 above. The precipitated alumina and silica are removed and placed into a reactor suitable to manufacture an aluminosilicate zeolite. Additional minor elements known in the art of making a zeolite such as titanium, magnesium, copper and the like are added to alumina and silica precipitate solution to create a zeolite solution that at a suitable temperature and pressure will create a gel like solution and crystalize into a 3-dimensional zeolite structure.

The zeolite is used to capture and remove carbon dioxide from a coal combustions power plant. The carbon dioxide embedded zeolite is then further combined in an acidic or alkaline solution with a carbonatable mineral to mineralize carbon dioxide as described in U.S. Pat. Nos. 11,884,602; 11,986,769; 12,291,491; and 12,145,882 and U.S. patent application Ser. No. 18/664,661 filed May 15, 2024 and Ser. No. 18/421,638 filed Jan. 24, 2024, the disclosures of which are all incorporated herein by reference in their entirety.

Example 17

A basaltic hyaloclastite mineral with the chemical composition of Example 14 above is processed is accordance with Examples 14 and 15 above. The precipitated silica is removed and placed into a reactor suitable to manufacture a silica-based zeolite. Additional minor elements known in the art of making a zeolite such as titanium, magnesium, copper and the like are added to the silica precipitate solution to create a zeolite solution that at a suitable temperature and pressure will create a gel like solution and crystalize into a 3-dimensional zeolite structure suitable for carbon dioxide absorption or any other type of absorption properties.

The zeolite is used to capture and remove carbon dioxide from the flue gas of a coal combustions power plant. The carbon dioxide embedded zeolite is then further combined in an acidic or alkaline solution with a carbonatable mineral to mineralize carbon dioxide as described in U.S. Pat. Nos. 11,884,602; 11,986,769; 12,291,491; and 12,145,882 and U.S. patent application Ser. No. 18/664,661 filed May 15, 2024 and Ser. No. 18/421,638 filed Jan. 24, 2024, the disclosures of which are all incorporated herein by reference in their entirety.

Example 18

A basaltic hyaloclastite mineral with the chemical composition of Example 14 above is processed is accordance with Examples 14 and 15 above. A portion of the ionic-liquid solution is removed and placed into a reactor suitable to manufacture a metal-organic framework. Additional minor elements known in the art of making a zeolite such as titanium, magnesium, copper and the like are added to the ionic-liquid solution to create a MOF that at a suitable temperature and pressure The MOF's is used to capture and remove carbon dioxide from the flue gas of a hydrocarbon combustion power plant. The carbon dioxide embedded MOF is then further combined in an acidic or alkaline solution with a carbonatable mineral to mineralize carbon dioxide as described in the U.S. Pat. Nos. 11,884,602; 11,986,769; 12,291,491; and 12,145,882 and U.S. patent application Ser. No. 18/664,661 filed May 15, 2024 and Ser. No. 18/421,638 filed Jan. 24, 2024, the disclosures of which are all incorporated herein by reference in their entirety.

Example 19

A basaltic hyaloclastite mineral with the chemical composition of Example 14 above is processed is accordance with Examples 14 and 15 above. The balance of the ionic solution dissolved from the hyaloclastite reaction with the sulfuric acid is removed and further processed in a subsequent electrochemical reactor and subjected to an electrowinning process of separating the metals whereby metals are deposited on the cathode. Metals and are removed from the cathode either as metal oxides or in pure form. Rare earth elements can be removed from the anode as oxidized rare earth compounds and used in any suitable application.

Example 20

A calcium-iron-aluminosilicate mineral with the chemical composition of Example 14 above is processed is accordance with Examples 14 and 15 above. The balance of the ionic solution dissolved from the hyaloclastite reaction with the sulfuric acid is removed and further processed in a subsequent electrochemical reactor. The resulting iron oxide is separated and removed from the reactor and combined with carbon dioxide creating iron carbonite (siderite) thereby mineralizing carbon dioxide.

It should be understood, of course, that the foregoing relates only to certain disclosed embodiments of the present invention and that numerous modifications or alterations may be made therein without departing from the spirit and scope of the invention.

What is claimed is:

1. A method comprising:
combining hyaloclastite with a first acid such that a first portion of the hyaloclastite reacts with the first acid to form a Ca salt, hydroxide or sulfate, wherein the hyaloclastite is basaltic hyaloclastite or intermediate basaltic hyaloclastite;
separating the Ca salt, hydroxide or sulfate from a second portion of the hyaloclastite that does not react with the first acid; and
reacting the Ca salt, hydroxide or sulfate with $CO_2$ so that the Ca salt, hydroxide or sulfate is converted to a carbonate.

2. The method of claim 1:
wherein the second portion comprises an Al-based first compound; and
further comprising reacting the second portion with a second acid to form an Al-based second compound different from the first compound.

3. The method of claim 1:
wherein the second portion comprises a Si-based third compound; and
further comprising reacting the second portion with a second acid to form a Si-based fourth compound different from the third compound.

4. The method of claim 1:
wherein the second portion comprises an Al-based first compound and a Si-based third compound; and
further comprising reacting the second portion with a second acid to form an Al-based second compound different from the first compound and a Si-based fourth compound different from the third compound.

5. The method of claim 2 further comprising at least partially forming a zeolite from the Al-based second compound.

6. The method of claim 3 further comprising at least partially forming a zeolite from the Si-based fourth compound.

7. The method of claim 4 further comprising at least partially forming a zeolite from the Al-based second compound and the Si-based fourth compound.

8. The method of claim 1, wherein the hyaloclastite is approximately 5% to approximately 97% by weight amorphous and is approximately 3% to approximately 95% by weight crystalline, microcrystalline or combinations or mixtures thereof.

9. The method of claim 8, wherein the hyaloclastite has a volume-based mean particle size of less than or equal to 500 µm.

10. The method of claim 8, wherein the hyaloclastite has a volume-based mean particle size of less than or equal to 100 µm.

11. The method of claim 8, wherein the hyaloclastite has a volume-based mean particle size of less than or equal to 20 µm.

\* \* \* \* \*